US006404576B1

(12) United States Patent
Hamaguchi et al.

(10) Patent No.: US 6,404,576 B1
(45) Date of Patent: *Jun. 11, 2002

(54) METHOD AND SYSTEM FOR COMPENSATION OF NONLINEARITY OR FLUCTUATION OF HEAD-POSITION SIGNAL

(75) Inventors: Takehiko Hamaguchi, Fuchu; Futoshi Tomiyama, Hachioji; Hideki Zaitsu, Kokubunji; Hisashi Takano, Kodaira, all of (JP)

(73) Assignee: Hitachi, Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/481,399

(22) Filed: Jan. 12, 2000

(30) Foreign Application Priority Data

Jan. 21, 1999 (JP) ............................................. 11-012731

(51) Int. Cl.[7] ............................. G11B 5/09; G11B 5/596
(52) U.S. Cl. ...................................... 360/48; 360/77.08
(58) Field of Search ............................... 360/48, 77.08, 360/77.02

(56) References Cited

U.S. PATENT DOCUMENTS 5,867,343 A * 2/1999 Le et al. .................. 360/77.08
6,005,738 A * 12/1999 Chainer et al. ........... 360/77.08

FOREIGN PATENT DOCUMENTS

| JP | 61-296531 | 12/1986 |
| JP | 62-204476 | 9/1987 |
| JP | 63-112874 | 5/1988 |

* cited by examiner

*Primary Examiner*—Regina Y. Neal
(74) *Attorney, Agent, or Firm*—Mattingly, Stanger & Malur, P.C.

(57) ABSTRACT

A plurality of patterns are formed so that each is deviated slightly from another in each sector in the track width direction. Then, the pattern is followed up, thereby obtaining both a full-track profile and a micro-track profile. A variation of a position signal is detected from this profile, thereby creating a table for correcting the non-linearity error of the position signal. Consequently, the distribution of the write/read-back property is measured, thereby enabling the track density to be improved. Furthermore, a variation of the position signal caused by a property variation of the head read-back element is detected and corrected, thereby enabling a high reliability and a high track density to be realized for the object magnetic recording disk apparatus.

4 Claims, 20 Drawing Sheets

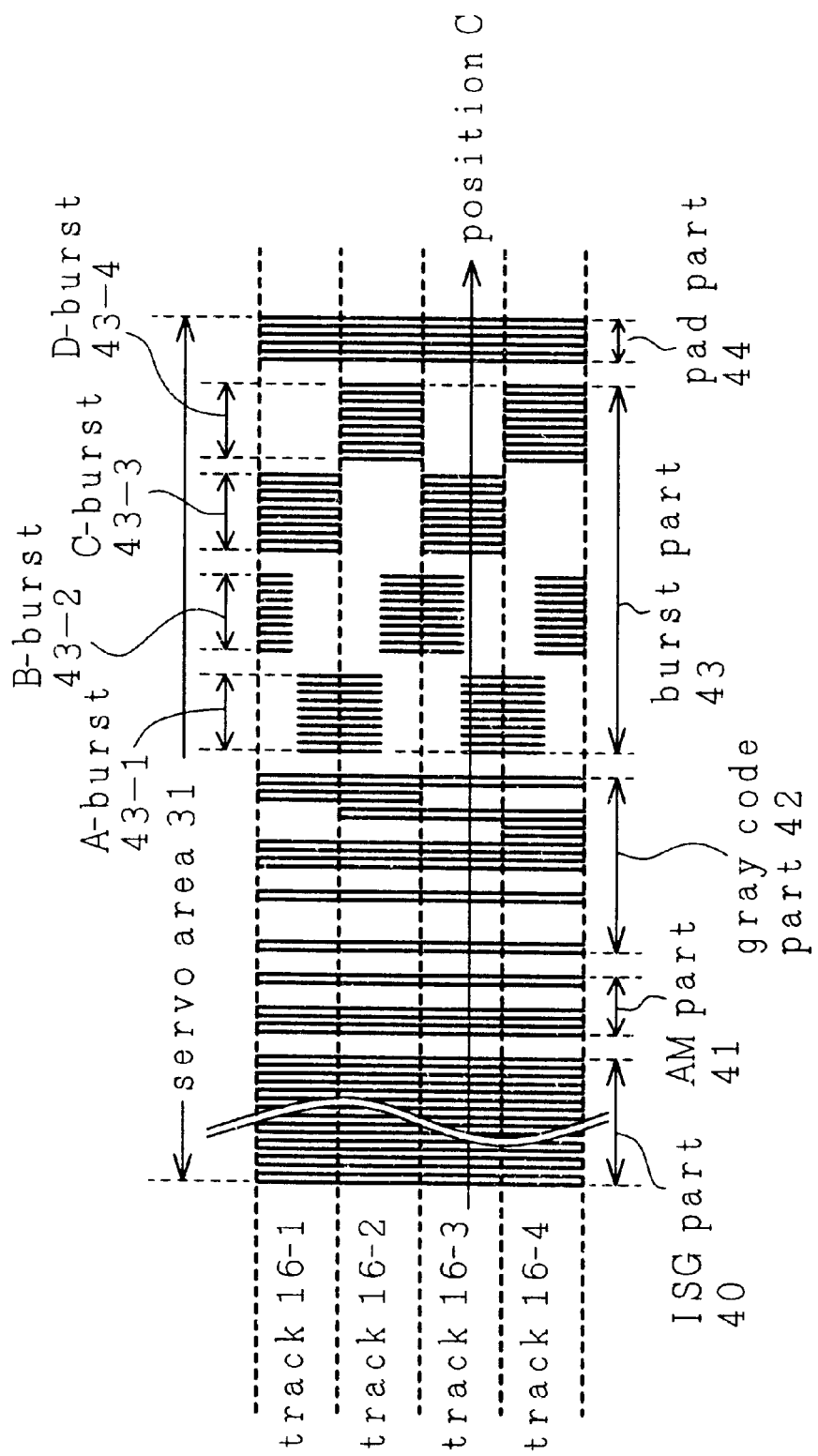

$$\frac{\text{A-burst} - \text{B-burst}}{\text{ISG}} = \text{N position signal}$$

$$\frac{\text{C-burst} - \text{D-burst}}{\text{ISG}} = \text{Q position signal}$$

METHOD AND SYSTEM FOR COMPENSATION OF NONLINEARITY OR FLUCTUATION OF HEAD-POSITION SIGNAL

BACKGROUND OF THE INVENTION

The present invention relates to an information recording apparatus provided with a magnetic conversion head and a magnetic recording medium, more particularly to a magnetic recording disk apparatus that has improved its track density.

Generally, in order to make a head follow up an object data track on a magnetic recording disk medium, the magnetic recording disk apparatus must enable relative positional information between the head and the magnetic recording disk medium to be kept measured accurately and a positional deviation caused by a thermal expansion difference between both magnetic recording disk medium and the arm that supports the head, as well as an influence of such a disturbance as rotation vibration of the spindle motor and the rotary actuator to be reduced. This is why special patterns for positioning the head are recorded on the magnetic recording disk medium before the shipping. The area in which such a pattern is recorded as shown in FIG. 6 is referred to as a servo area 31. The servo area 31 is formed between data areas 33 via a gap area 32. After the shipping, it is inhibited that the user records data in this servo area 31. In the servo area 31 is recorded data continuously between adjacent tracks 16 in the radial direction. The servo track width 311 is equal to the track pitch of the tracks 16. On the other hand, in a data area 33, recorded data on each track 16 is separated from another. The recording track width 331 is narrower than the track pitch of the tracks 16. Actually, 60 to 100 servo areas 31 are formed at equal pitches on a round of track 16 of the magnetic recording disk medium.

FIG. 7 shows a configuration of such a servo area 31. An ISG part 40 is a continuous pattern provided so as to reduce the influence of the distribution of the magnetic property in the recording film and the distribution of the flying height of the magnetic recording disk medium. The servo decoder circuit reads back the ISG part 40 by turning on the auto gain control (AGC). Upon detecting an AM part 41, the AGC is turned off, thereby the magnetic recording disk apparatus of the present invention normalizes the read-back amplitude of the subsequent burst parts 43 with the amplitude of the ISG part 40. A gray code part 42 describes the track number information of each track 16 with a gray code. This part 42 often describes sector number information, as well. The burst part 43 makes a houndstooth check pattern for obtaining accurate positional information in the radial direction. This part 43 is indispensable for following up the center of each track 16 accurately. This pattern 43 consists of a pair of A-burst 43-1 and B-burst 43-2 that are provided as straddle the center of each track 16 alternately, as well as C-burst 43-3 and D-burst 43-4 that are provided as straddle the edge of each track 16 alternately. A pad part 44 is a pattern provided so as to absorb the delay of the decoder circuit system to keep generating a clock while the servo decoder circuit reads back the servo area 31.

The head 11 reads back the servo areas 31 while running on the position C shown with an arrow from left to right in FIG. 7. FIG. 8(A) shows an example of the read-back waveform at that time. To simplify the description, the read-back waveforms of the AM part 41, the gray code part 42, and the pad part 44 are omitted here. The servo decoder circuit 44 detects the amplitudes of the four burst parts (from the A-burst part 43-1 to the D-burst part 43-4). The amplitude value of each burst part is converted to a digital value in the AD converter, then entered to a CPU. The CPU then calculates the difference between the amplitudes of the A-burst part 43-1 and the B-burst part 43-2, thereby finding the N position signal. Although an equation for normalizing the difference with the amplitude of the ASG part 40 is described in FIG. 7, this function is realized by hardware in which the servo decoder circuit locks the AGC so as to fix the amplitude of the ISG part 40. In the same way, the CPU obtains the Q position signal from the difference between the amplitude values of the C-burst part 43-3 and the D-burst part 43-4. FIG. 8B shows the position signals of the head, which are generated as described above. The N position signal becomes 0 at a position where the center of the head 11 straddles the A-burst part 43-1 and the B-burst part 43-2 equally. The N position signal becomes positive or negative almost in proportion to a deviation from this center position. For example, the N position signal at the position C shown in FIG. 8B can be obtained from the read-back waveform shown in FIG. 8(A) at the position C shown in FIG. 7. Usually, it is assumed that the edges of both A-burst part 43-1 and B-burst part 43-2 match with the center of each track 16.

The CPU inverts the status (positive/negative) of the N or Q position signal, whichever is smaller in absolute value, then links the signals, thereby generating a continuous position signal. This position signal is then compared with a target position, thereby finding an optimal current value to be applied to a voice coil motor 14 so as to perform such predetermined operations as following-up and seeking.

A technique for forming a spiral data track itself is disclosed in Japanese Published Unexamined Patent Application No. 62-204476, No. 63-112874, and No. 61-296531 respectively. A technique for forming spiral servo information itself is disclosed in FIG. 1 of Japanese Published Unexamined Patent Application No. 62-204476.

BRIEF SUMMARY OF THE INVENTION

The above conventional techniques, however, have been confronted with a problem that non-uniformity of the direction of magnetization in the read-back element degrades the linear accuracy of the position signal, thereby the radial position of the head cannot be controlled accurately. In addition, those conventional techniques have also been confronted with a problem that because the detection accuracy of the position signal is degraded by a property variation of the read-back element, the radial position of the head cannot be controlled accurately.

In the recent years, however, it is common that a high read sensitivity head is used to increase the recording density of the object magnetic recording disk apparatus. For example, there are well-known techniques for using a read-back head that employs a magnetoresistive element (MR element) that makes good use of the magnetoresistive effect of the magnetic film itself, a giant magnetoresistive element (GMR element) that has improved the magnetoresistive effect with a non-magnetic film sandwiched by magnetic films, or a tunnel magnetoresistive element (TMR element) that has improved the magnetoresistive effect more with use of a phenomenon that a tunnel current is changed by an external magnetic field significantly. Those techniques are all effective, since each of those magnetoresistive elements can obtain a favorable SN ratio even in reading back fine recorded patterns on magnetic recording disks, thereby the bit density of the object magnetic recording disk apparatus can be improved.

Generally, both ends of a magnetoresistive element are structured so as to enable a bias magnetic field (vertical bias magnetic field) to be applied in the width direction of the track, thereby forming the magnetic film of the element in a single magnetic domain structure. Consequently, the read-back sensitivity is degraded with respect to the strength of the leakage magnetic field of the object disk at both ends of the element, thereby the output is not made in uniform in the width direction of the track. In addition, because the magnetizing direction is disturbed at both ends of the element, the amplitude value may differ significantly between positive side and negative side of the read-back waveform. And furthermore, the non-uniformity of the magnetizing direction, which is a problem mentioned here, may be varied in various forms due to the recording magnetic field generated by the write element provided adjacently to the magnetoresistive element. This phenomenon is referred to as a property variation of the read-back element. This property variation of the read-back element may also occur due to a change of the flying attitude of the head caused by a wear, a flaw, and a contaminant thereon.

Because the read-back sensitivity is low at both ends of the element, the read-back amplitude of the burst part 43 is not proportional to the radial position of the head. Both of N and Q position signals also do not become proportional to the radial position of the head exactly. If any asymmetrical component of the vertical amplitude is contained in the read-back waveform of the burst part 43, then the constant of the decoder circuit comes to depend on the position signal significantly, thereby the errors of both N and Q position signals become more serious. Because of those negative factors, the N and Q position signals of the magnetic recording disk apparatus that uses a magnetoresistive element do not become linear as shown in FIG. 8B. There is a technique for improving the accuracy for detecting the error level referred to as a non-linearity error of this position signal by creating a correction table and using the table. In this case, however, a correction table must be prepared for each head mounted in the magnetic recording disk apparatus and the table must be recorded in the memory of the package board 17 or in part of the management area on the disk 12 before shipping. Consequently, the management of production processes becomes complicated, and furthermore, the difference among properties of decoder circuits cannot be corrected even with this technique. Those factors have thus been an obstacle for the improvement of the track density of the apparatus.

Furthermore, the center of a track to follow up may be offset due to a change of the non-linearity error level if a property variation occurs in the read-back element. To avoid such a read-back error to occur due to a change of the property variation of the read-back element, therefore, a current is applied to the write element so as to execute a dummy write operation that applies an external magnetic field to the read-back element intentionally, thereby eliminating the property variation. This is a well-known technique. And yet, there is still another problem that must be solved. The problem is a fact that the content of the variation in a magnetized state differs between property variation of the read-back element related to the non-linearity of the position signal and the property variation of the read-back element related to a read-back error. The technique that performs a dummy write operation after a read-back error occurs cannot avoid a possibility that an offset from a target track, thereby overwriting is done on an adjacent track. This has been a factor for degrading the reliability of the magnetic recording disk apparatus.

This is why there has been expected appearance of a new technique that enables the non-linearity error of the position signal caused by the read-back property of the head and the servo decoder circuit property to be corrected so as to improve the positioning accuracy, thereby detecting the property variation of the read-back element related to the non-linearity error of the position signal and improve the data track density of the magnetic recording disk apparatus that employs a magnetoresistive element as the read-back element. It is thus possible to prevent the fatal error that overwrites data on adjacent tracks so as to improve the reliability of the apparatus.

In order to achieve the above objects, the magnetic recording disk apparatus of the present invention comprises a magnetic recording disk medium provided with a plurality of tracks formed thereon in a concentric circle pattern and a servo area formed on a part of each tracks and used to record a servo pattern; a magnetic recording head provided with a read-back element and a write element; and a servo decoder circuit for generating a head position signal from the servo pattern formed on the magnetic recording disk medium; wherein a plurality of patterns are disposed in an area different from the servo area on the disk medium. Each of a plurality of the patterns is deviated from another in the radial direction of the track at least by a width narrower than the width of the read-back element of the head.

Furthermore, a plurality of full tracks are disposed in some radial areas on the disk so that each of the full tracks is deviated slightly from another in the radial direction of the disk and the amplitude of the read-back waveform of each of those full tracks is detected while following up the track, thereby measuring the profile of each full track from the amplitude of the read-back waveform.

Furthermore, in the magnetic recording disk apparatus of the present invention, a plurality of micro-tracks are disposed in some radial areas on the disk so that each of those micro-tracks is deviated slightly from another in the radial direction of the disk and the amplitude of the read-back waveform of each of a plurality of the micro-tracks is detected while the track is followed up, thereby measuring the profile of the micro-track from the amplitude of the read-back waveform.

The magnetic recording disk apparatus is provided with a function for calculating an effective write or read-back width of the head from the profile of the full-track or the micro-track. The magnetic recording disk apparatus is also provided with a function for correcting the non-linearity of the head position signal from the profile of the full-track or the micro-track. The magnetic recording disk apparatus is further provided with a function for detecting a variation of the head position signal from the profile of the full-track or the micro-track. The magnetic recording disk apparatus is further provided with a function for detecting a variation of the head read-back property from the profile of the micro-track. In addition, the magnetic recording disk apparatus is further provided with a function for correcting the variation if the variation is out of a preset range.

BRIEF DESCRIPTION OF THE DRAWINGS

FIG. 7 is an explanatory view of a structure of a servo area of the magnetic recording disk apparatus.

DESCRIPTION OF THE SYMBOLS

11 . . . Head 12 . . . Disk 13 . . . Rotary Actuator 14 . . . Voice Coil Motor 15 . . . Head Amplifier 16 . . . Track 17 . . . Package Board 31 . . . Servo Area 32 . . . Gap Part 33 . . . Data Area 40 . . . ISG Part 41 . . . AM Part 42 . . . Gray Code Part 43 . . . Burst Part 44 . . . Pad Part 51 . . . Pattern for Detection Full-track Profile 52 . . . Pattern for Detection Full-track Profile 53 . . . Pattern for Detection Full-track Profile 54 . . . Pattern for Detection Full-track Profile 55 . . . Micro Servo Area 56 . . . Pattern for Detection Micro-track Profile 57 . . . Pattern for Detection Micro-track Profile

DETAILED DESCRIPTION OF THE INVENTION

EMBODIMENT 1

Figure 3:
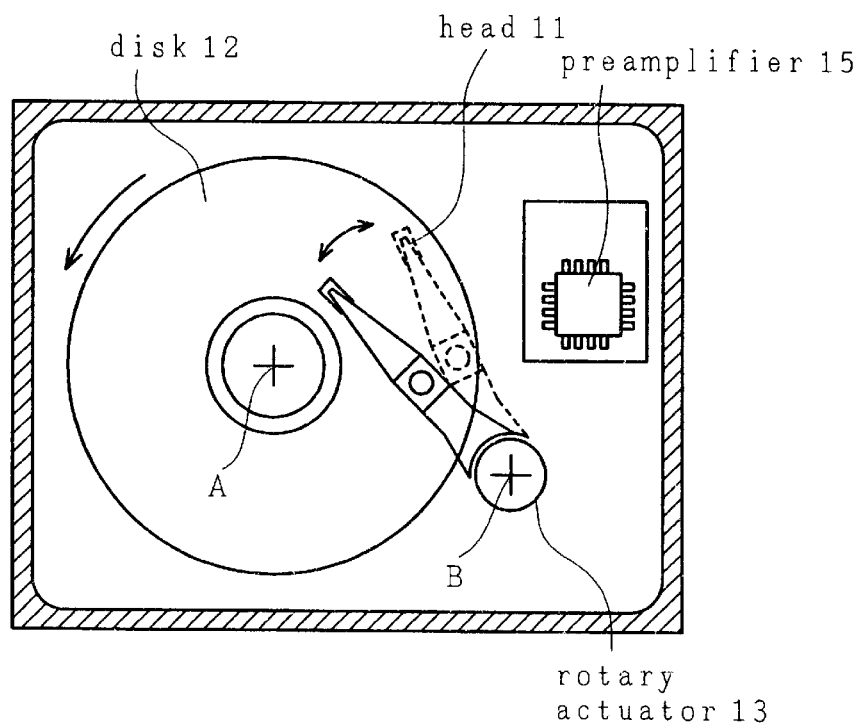
FIG. 3 is a top view of a structure of a magnetic recording disk.
Figure 4:
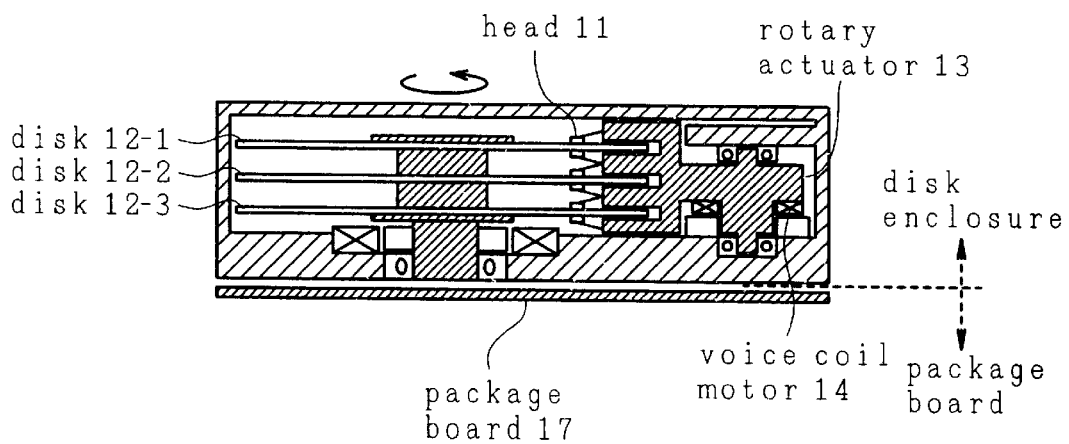
FIG. 4 is a cross sectional view of the structure of the magnetic recording disk.

FIG. 3 shows a top inside view of an enclosure of a magnetic recording disk apparatus and FIG. 4 shows a cross sectional view of the apparatus. The main parts composing the magnetic recording disk apparatus are as shown in FIGS. 3 and 4, that is, six heads 11; three disks 12; a rotary actuator 13; a voice coil motor 14; a head amplifier 15; a package board 17, etc. The three disks 12 are fixed to a hub and each of the disks 12 is rotated around the point A by a spindle motor. The six heads 11 are fixed to a comb-like arm and each of the heads 11 is rotated around the point B by the rotary actuator 13. With this mechanism composed as described above, each head 11 can move freely in the radial direction of the disk 12. In the package board 17 are mounted a central processing unit (CPU) used for controlling; a hard disk controller (HDC); an interface circuit; a memory; a signal processing unit, etc. Because the S/N ratio and the transfer rate are improved more if the head amplifier 15 is disposed near to each head 11, the head amplifier 15 is not mounted on the package board 17; it is often mounted in the enclosure.

Figure 5:
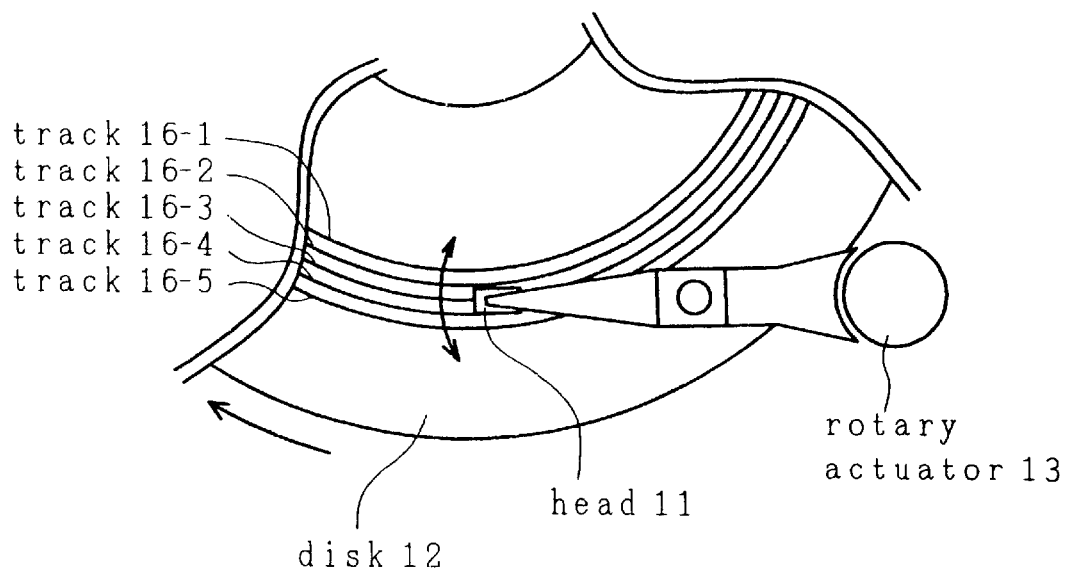
FIG. 5 is a bottom view of part of the magnetic recording disk.
Figure 6:
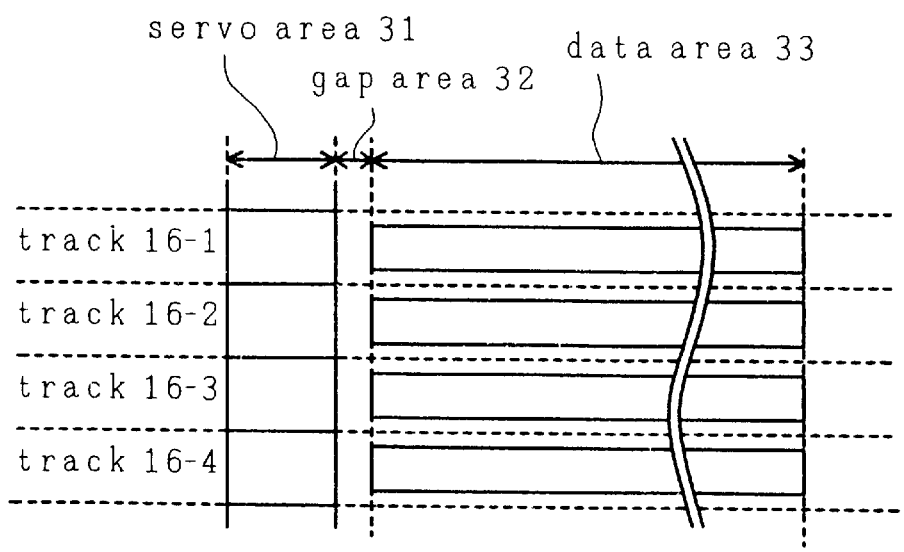
FIG. 6 is an explanatory view of a structure of a sector of the magnetic recording disk apparatus.

FIG. 5 shows a top partial view of the disk 12. Each head 11 is fixed at a radial position of any of data tracks 16-1, 16-2, . . . on a disk 12 by the rotary actuator 13 and used to write and read back information in and from the data tracks 16 electrically. Data tracks 16 are formed at equal pitches in a concentric circle pattern.

Although only four data tracks 16-1 to 16-4 are shown in the explanatory view in FIG. 5, there are more than 8000 data tracks actually formed at pitches of 2 $\mu$m or under on the disk 12.

Figure 1:
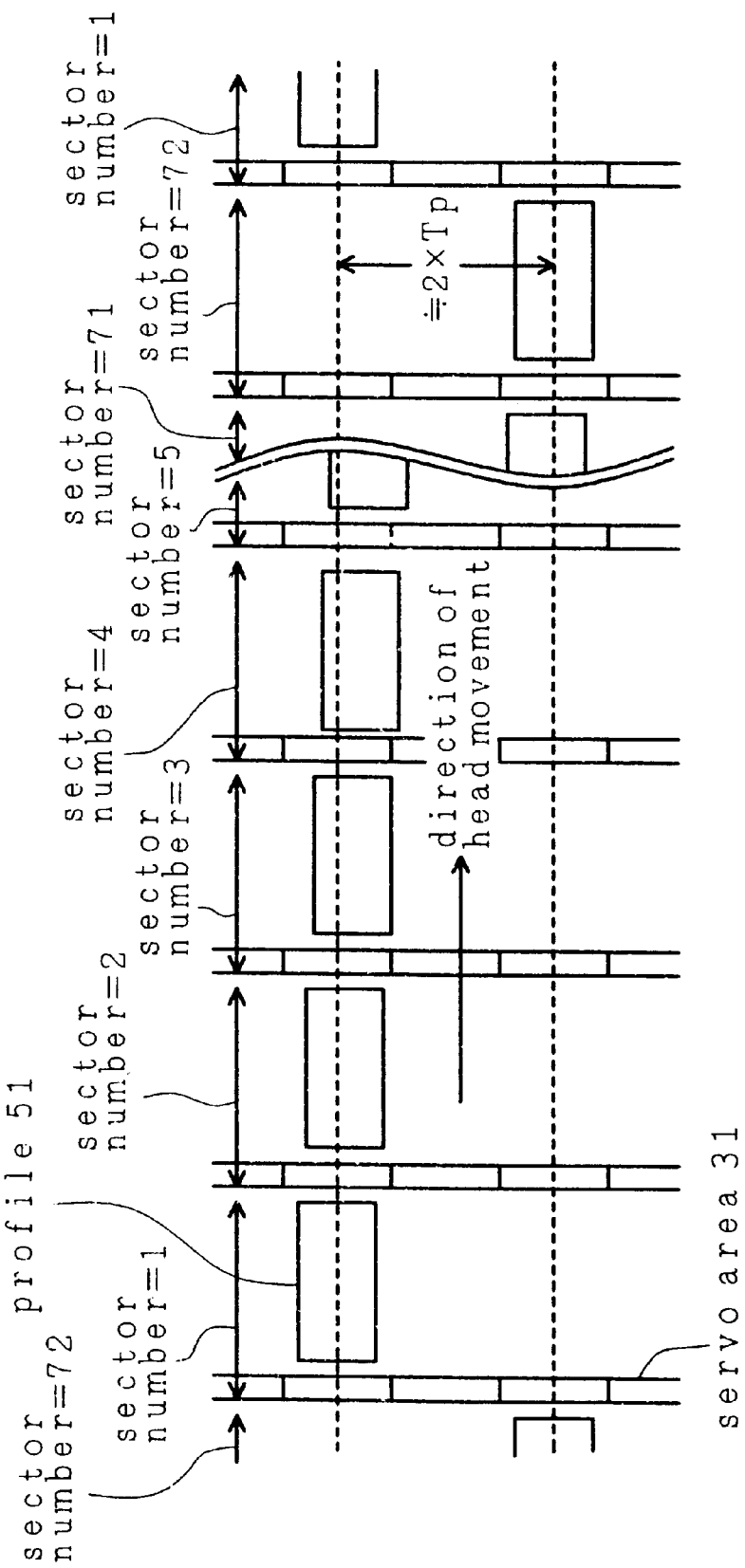
FIG. 1 shows the first example of a pattern for detection full-track profile of the present invention.

FIG. 1 shows a configuration of a pattern for detection full-track profile 51, which is used to detect the profile of each full-track (provided with a width equal to the width of a recording track in a data area) in an embodiment of the present invention.

In FIG. 1, the horizontal direction indicates the circumferential direction of the disk 12 and the vertical direction indicates the radial direction of the disk 12. Each head 11 moves both in the direction in which the head runs and in the direction shown with an arrow at a speed of 6 to 11 m/sec relatively to the disk 12. In FIG. 1 an area assigned with a sector number 1 is duplicated at both right and left sides. This is just appearance, because a one round pattern on the disk 12 formed in circumference is drawn linearly. The areas on both right and left sides are thus in one and the same sector 1 actually. The areas assigned with a sector number 72 are also in one and the same area actually. Some servo areas 31 shown in FIG. 1 are composed just like those described in the related art. The magnetic recording disk apparatus composed as described above are provided with 72 servo areas 31 formed at equal pitches on a round of the disk 12. A total of the 72 servo areas 31 occupies a length of about 7% of a round of the disk 12. The track pitch (Tp) is 1.78 $\mu$m and the symbol 2×Tp shown in FIG. 1 means an equivalence to 3.55 um.

A pattern for detection full-track profile 51 is recorded between servo areas 31. The pattern for detection full-track profile 51 is a pattern having a width equal to that of the recording track 331 in each data area 33. In this configuration of the disk 12, the pattern for detection full-track profile 51 is recorded as simple repetitive patterns to be inverted at a 20 MHz clock. If this pattern 51 is read back from a track, the pattern 51 takes a waveform close to a 10 MHz sine wave. Unlike the pattern in a normal data area 33, it is characterized by the use of a simple magnetizing pattern. None of such magnetizing patterns as the PLL sink area, the data address mark, the ECC, the CRC is not used.

The patterns for detection full-track profile 51 recorded in the area whose sector numbers are 1 and 2 respectively are magnetized patterns having the same frequency, but they are deviated from each other only by 0.05 $\mu$m in the radial direction of the disk. In addition, the patterns for detection full-track profile 51 recorded in the areas whose sector numbers are 3 to 72 are deviated from each other only by 0.05 $\mu$m sequentially in the same direction. Consequently, the patterns for detection full-track profile 51 recorded in the areas whose sector numbers are 1 and 72 are deviated from each other only by 3.55 $\mu$m sequentially in the radial direction of the disk. The 3.55 $\mu$m is double the track pitch.

Hereunder, a description will be made for a process for writing the pattern shown in FIG. 1 described above with reference to FIG. 9. In the servo area writing process included in the manufacturing processes carried out in a factory, the pattern is written with use of a manufacturing apparatus referred to as a servo track writer. The servo track writer uses an external laser measuring apparatus to drive the rotary actuator 13 while measuring the position of each head 11 accurately. At first, data is written in servo areas 31 entirely in the full radius range of the disk 12. After that, control goes to the process for writing a pattern for detection full-track profile 51.

Figure 9A:
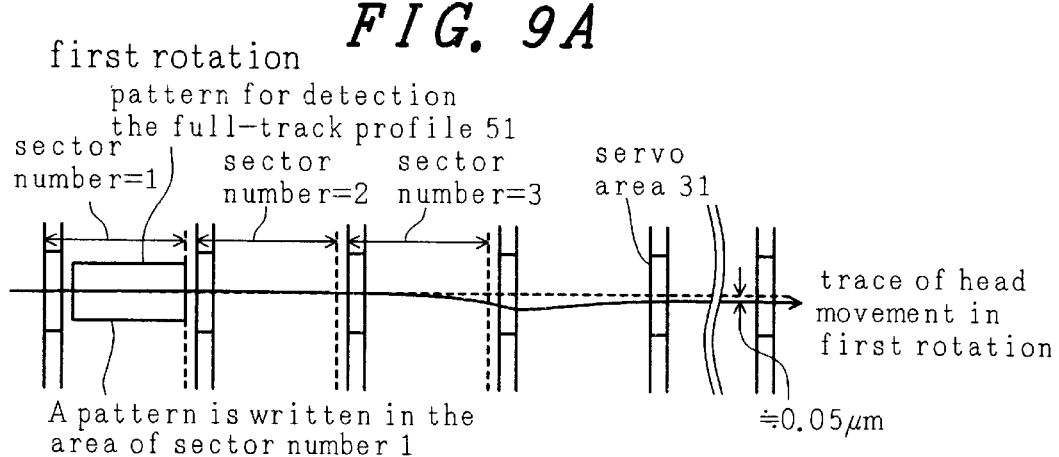
FIG. 9 shows a process for creating a pattern for detection full-track profile of the present invention.
Figure 9B:
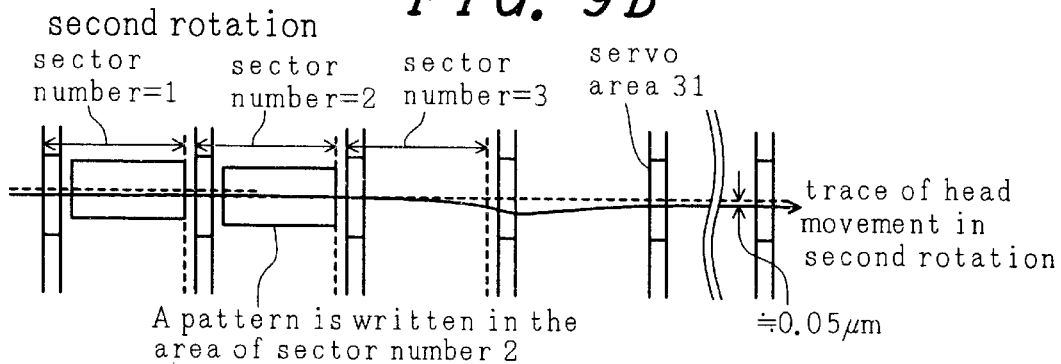
Figure 9C:
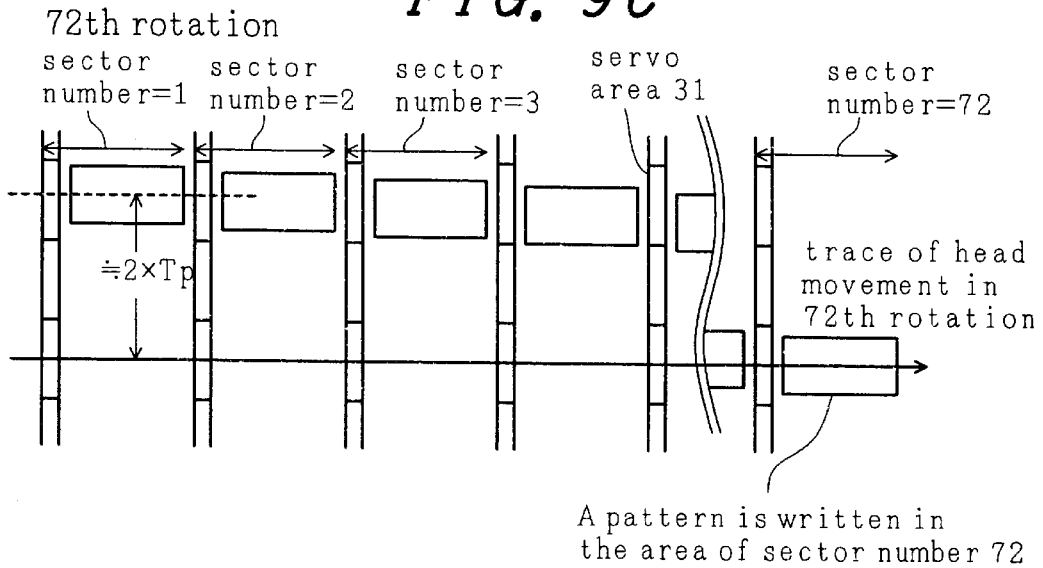

FIG. 9(A) shows a head 11 moved only by 0.05 $\mu$m in the radial direction upto a position where a pattern for detection full-track profile 51 is recorded in an area whose sector number is 1, then another pattern for detection full-track profile 51 is recorded in an area whose sector number is 2. This state of the disk 12 indicates that the disk 12 has been rotated once. FIG. 9B shows the state of the disk 12 after it is rotated twice. This state indicates that the head 11 is moved only by 0.05 $\mu$m in the radial direction upto the next writing position after a pattern for detection full-track profile 51 is written in the area whose sector number is 2. FIG. 9C shows a state of the disk 12 started at sector number 3 has just finished the pattern writing after 72 times of rotation. Finally, the patterns for detection full-track profile 51 written in the areas whose sector numbers are 1 and 72 are deviated from each other by 3.55 $\mu$m sequentially in the radial direction of the disk 12. The time required for forming the 72 patterns described above, if the disk 12 is rotated at 400 rpm, is 72×0.015=1.08 s. In this case, it is premised that the disk 12 is rotated once at 0.015 s. On the contrary, the time for forming a normal servo area 31 is $$8000 \times 2 \times 0.015 + 8000 \times 2 \times 0.015 \times \frac{1}{3} = 320 \text{ s}$$

if the disk 12 is rotated at 4000 rpm and servo writing is done on 8000 tracks at ½ pitches and the disk is rotated by ⅓ while the head is moved to an adjacent track. The time required for adding a pattern for detection full-track profile 51 of the present invention is very slight when compared with the time required for a normal servo track writing process.

Figure 2:
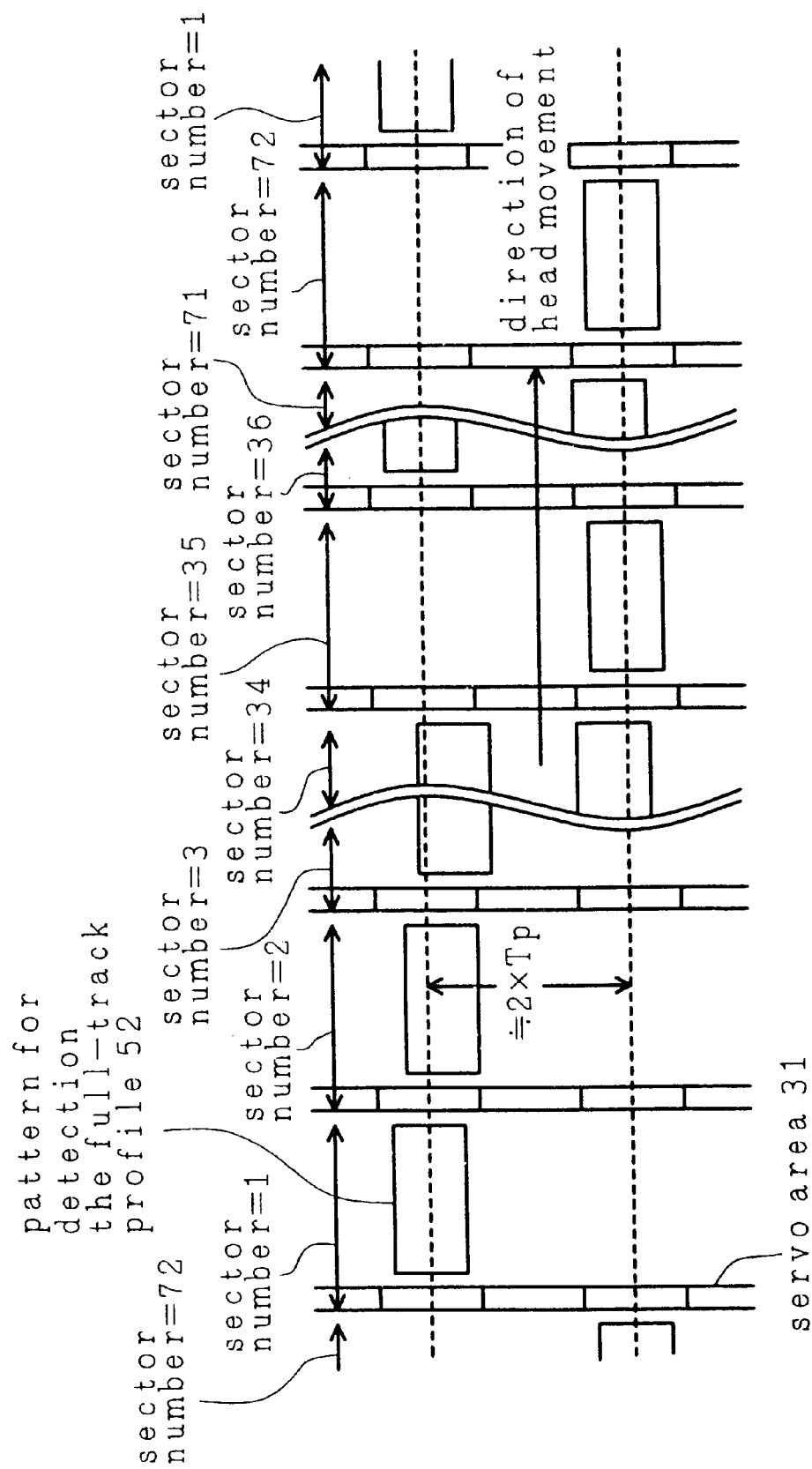
FIG. 2 shows the second example of a pattern for detection full-track profile of the present invention.

FIG. 2 shows a configuration of the pattern for detection full-track profile 52 as another embodiment of the present invention. The vertical direction in FIG. 2 is the radial direction of the disk 12 and the pattern 52 consists of 72 servo areas just like in the configuration of the pattern 51 shown in FIG. 1. In FIG. 2, however, the track pitch (Tp) is 1.75 $\mu$m and the symbol 2×Tp shown in FIG. 2 means an equivalence to 3.5 um.

The patterns for detection full-track profile 52 written in the areas whose sector numbers are 1 and 2 are magnetized patterns having the same frequency, but they are deviated from each other by 0.1 $\mu$m in the radial direction of the disk. In addition, the patterns for detection full-track profile 52 written in the areas whose sector numbers are 3 to 35 are deviated from each another by 0.1 $\mu$m sequentially in the radial direction of the disk. The patterns for. detection full-track profile 52 written in the areas whose sector numbers are 1 and 35 are deviated from each other only by 3.5 $\mu$m sequentially in the radial direction of the disk. The 3.5 $\mu$m is an equivalence to double the track pitch. In the area whose sector number is 36 is written a pattern for detection full-track profile 52. The area is written in the same radial position as that of the area whose sector number is 1. In the same way, in the areas whose sector numbers are 37 to 72 are written patterns for detection full-track profile 52 in the same radial positions as those of the areas whose sector numbers are 2 to 35.

The pattern 52 shown in FIG. 2, when compared with the pattern 51 shown in FIG. 1, is deviated from another only by a half, so the profile detecting accuracy also becomes a half. On the contrary, because the same pattern is repeated twice while the disk is rotated once, the error to be caused by the mechanical vibration when in writing and in reading back patterns can be reduced with employment of an averaging processing. It depends on the mechanical vibration content of the servo track writer and the spindle motor which pattern can detect the full-track profile more accurately. Although the pattern described here is formed by dividing a 2×Tp track width by 36 within a range of ½-round of the disk, the track width, the disk rotation distance, and the dividing number can be decided freely.

Figure 10:
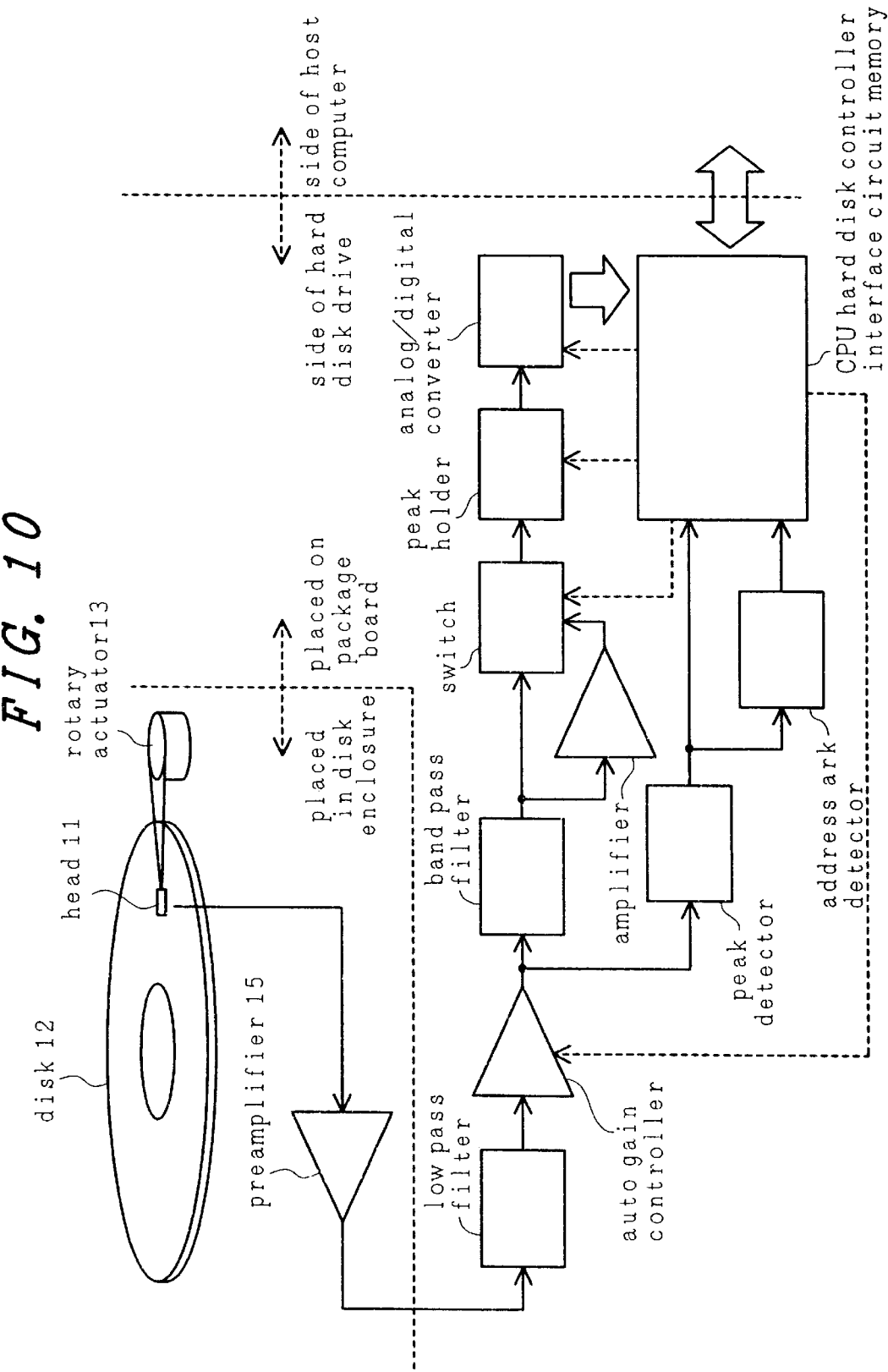
FIG. 10 is a block diagram of a pattern detector circuit of the present invention.

FIG. 10 shows a block diagram of a decoder circuit for detecting full-track profiles from the pattern of the present invention.

Figure 8A:
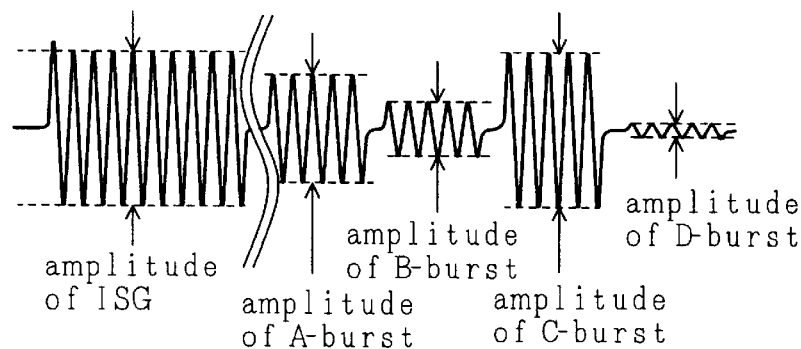
FIG. 8 shows a process for calculating a position signal from a servo read-back waveform.
Figure 8B:
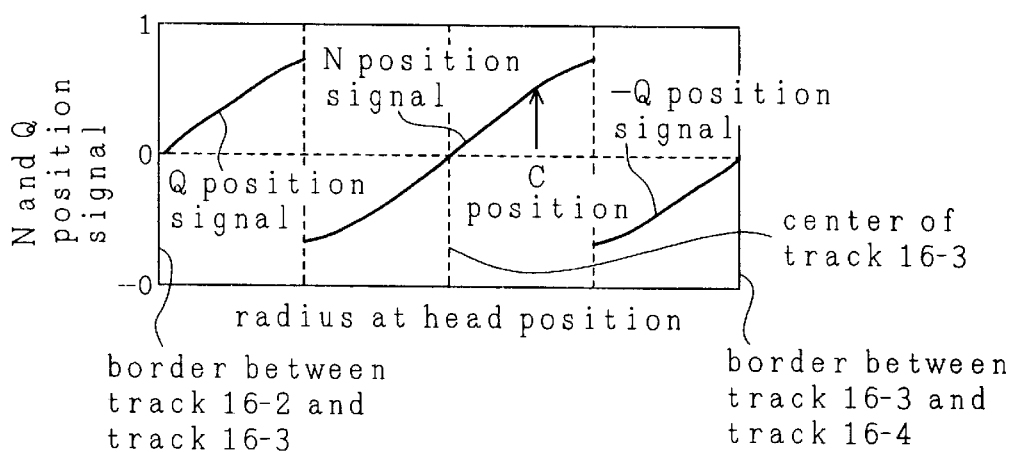

In order to simplify the configuration, the decoder circuit system of the present invention is just composed by adding a band-pass filter (BPF), an amplifier (AMP), and a switch to the conventional servo decoder circuit. Read-back data output from a head 11 is amplified by 100 to 200 times in the amplifier 15, then high frequency component noises are removed from the data with use of a low-pass filter (LPF). The auto gain controller (AGC), as described in the related art with reference to FIGS. 7 and 8, adjusts the amplitude of read-back waveforms so as to fix the amplitude of the ISG part 40. When the address mark detector (AM detector) detects the AM part 41 from a signal obtained by converting a read-back waveform to a digital waveform in the peak detector, the AGC is turned off to fix the amplified gain, thereby the detecting accuracy of the pattern for detection full-track profile is prevented from non-uniformity of magnetic property of the disk and influence of the disk flying height.

The center frequency of the BPF is set to 10 MHz, which is the same as the read-back frequency of the pattern for detection full-track profile, so that noise is removed from the signal component of the pattern, thereby the detecting accuracy is improved. The switch selects the BPF side when in detecting a full-track profile. When in detecting a microtrack profile to be described later, the switch selects the amplifier (AMP) side. The bit length of the pattern for detection full-track profile can be set longer than the burst part 43 in a normal servo area 31, so the integral time constant of the integrator is set long according to the length of the pattern so as to improve the detecting accuracy. The A/D converter converts the amplitude of the pattern detected by the integrator to a digital value. The central processing unit (CPU) and the hard disk controller (HDC) are used to control the timings of the AGC, the switch, the integrator, and the A/D converter.

Figure 11A:
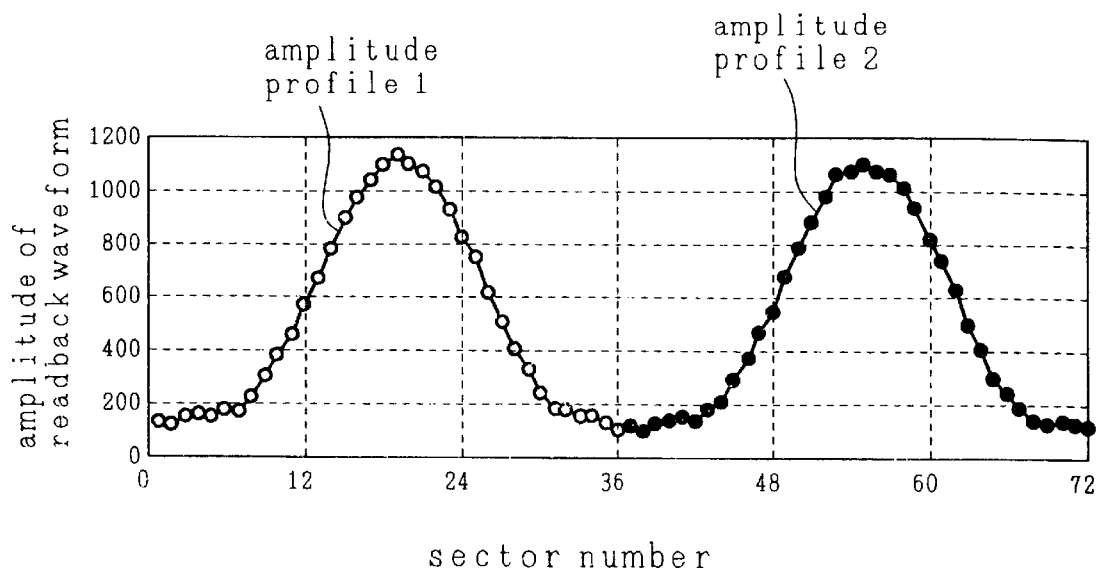
FIG. 11 shows an example of a full-track profile detected from a pattern of the present invention.
Figure 11B:
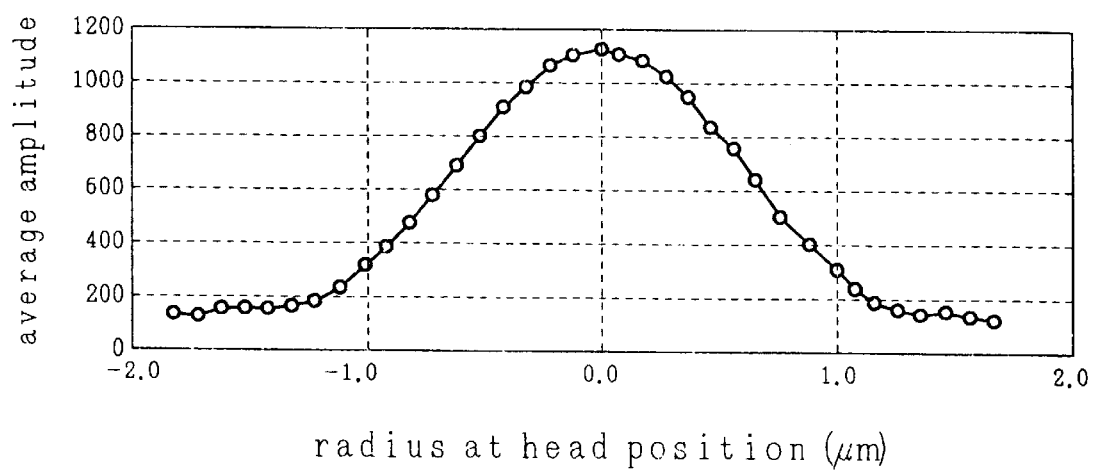

FIG. 11(A) shows a case in which the pattern shown in FIG. 2 is written by a head 11 on a disk 12 built in a magnetic recording disk apparatus and a read-back amplitude is detected in each sector. In FIG. 11(A), the horizontal axis indicates sector numbers. Sector numbers 1 to 72 are equivalent to sectors on a round of the disk. The vertical axis indicates output values from the A/D converter that detects the amplitude of each sector. The read-back profiles 1 and 2 indicated with white and black circles are not the same, since they are influenced by the mechanical vibration of the servo track writer when in writing patterns and by the mechanical vibration of the spindle motor when in reading back patterns. FIG. 11B shows an average of the profiles 1 and 2 shown in FIG. 11(A). In FIG. 11B, the horizontal axis indicates the average profile converted in units of um. When the radial position of the head exceeds the ±1.2 μm range, the output, value becomes a value on the noise level of the detection system. This profile is a full-track profile detected automatically on the disk built in the magnetic recording disk apparatus. The horizontal axis is calibrated with the accuracy of the laser measuring apparatus of the servo track writer.

Figure 12:
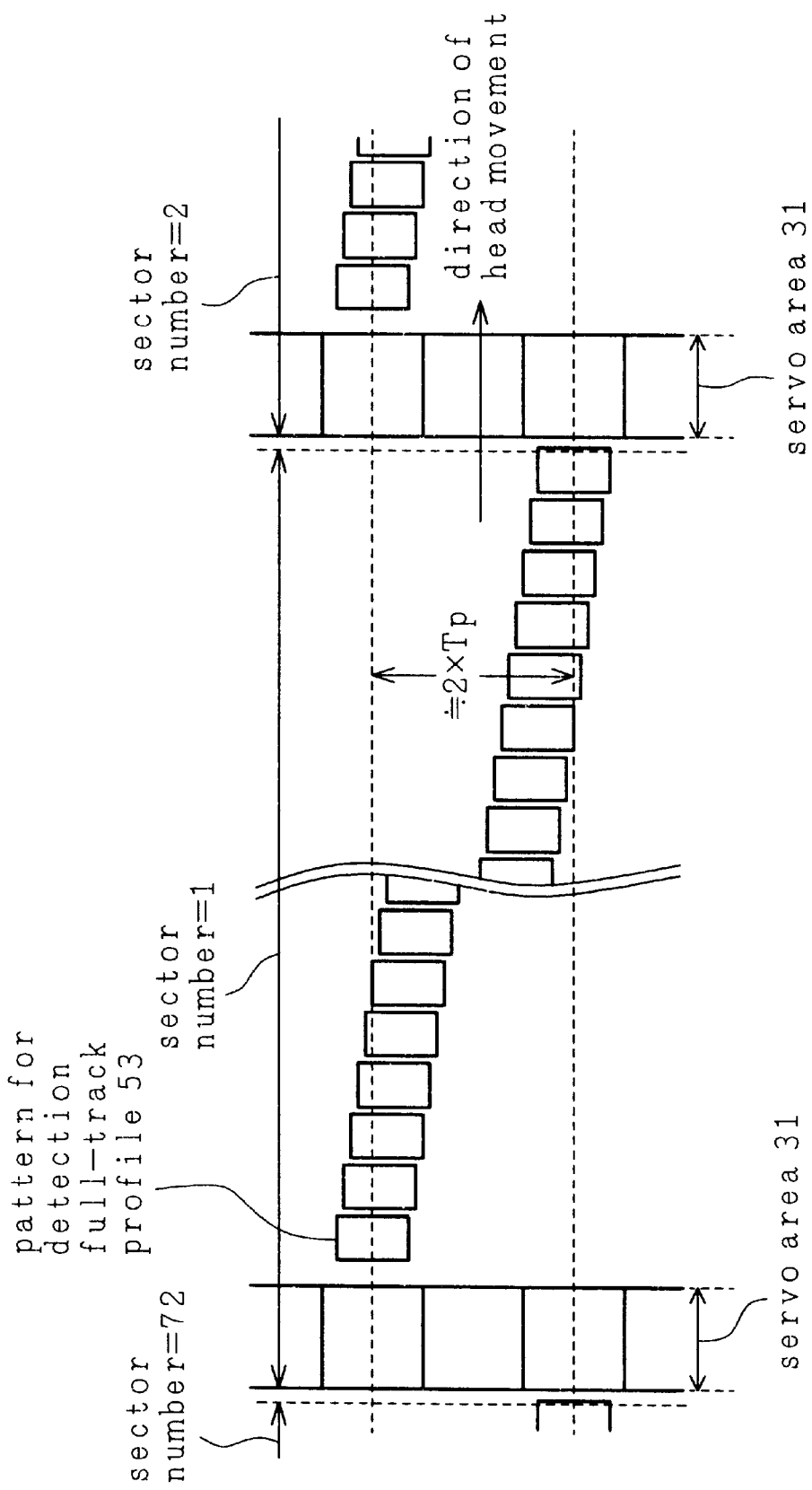
FIG. 12 shows the third example of the pattern for detection full-track profile of the present invention.

FIG. 12 shows a configuration of a pattern for detection full-track profile 53 as further another embodiment of the present invention. In order to improve the detecting accuracy, the pattern for detection full-track profile 53 is multiplexed before it is written, so that the pattern 53 enables an averaging processing to be performed as many as possible. In FIG. 12, the vertical direction is the radial direction of the disk 12 and the horizontal direction is the circumferential direction of the disk 12. Although there is only one servo area whose sector number is 1 in an expanded view in FIG. 12, there are actually 72 servo areas 31. The track pitch is 1.78 μm and the symbol 2×Tp shown in FIG. 12 means an equivalence to 3.55 just like in the configuration of the pattern shown in FIG. 1.

In order to multiplex each pattern for detection full-track profile 53 before it is written, the pattern length is set shorter than that shown in FIG. 1. This pattern is written by 72 times in an area whose sector number is 1 so that each pattern is deviated from another by 0.05 μm sequentially in the radial direction of the disk. Consequently, the patterns at both start and end of each sector are deviated from each other by 3.55 μm in the radial direction of the disk. The 3.55 μm is a length equivalent to double the track pitch. In addition, the same configuration pattern as that written in the area whose sector number is 1 is thus written in the areas whose sector numbers are 2 to 72.

The pattern 53 shown in FIG. 12, when compared with the pattern 51 shown in FIG. 1, can reduce the error occurrence caused by the mechanical vibration when in writing and reading back patterns significantly with execution of an averaging processing, since the same pattern is repeated by 72 times while the disk 12 is rotated once. On the other hand, because each pattern for detection full-track profile 53 is short, this configuration arises problems that the pattern amplitude detecting accuracy is degraded and a high accuracy is required for generating a clock from the detector. Although the pattern in this embodiment is formed by dividing a 2×Tp track width by 72 within a sector range, the track width and the dividing number may be decided freely.

Figure 13:
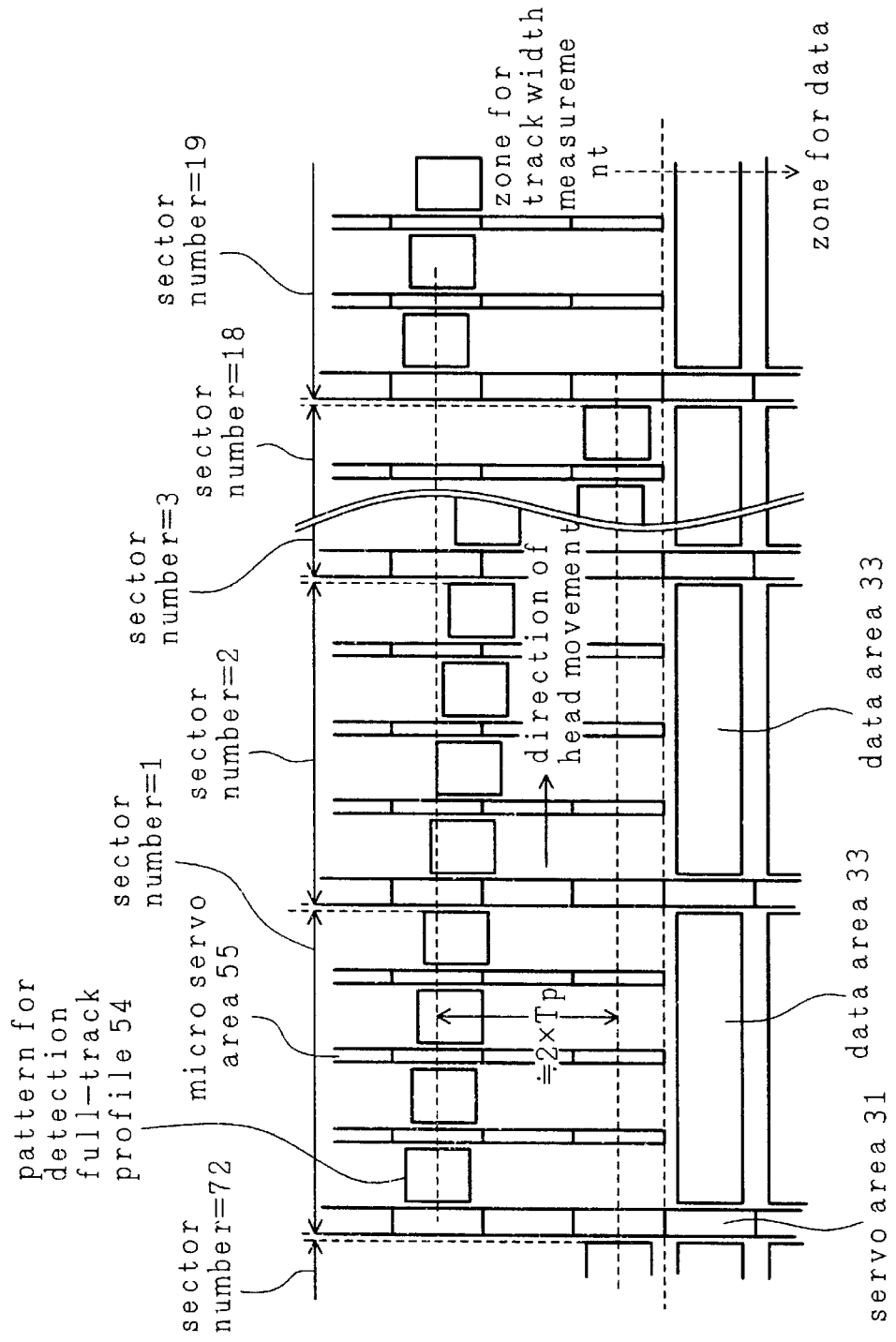
FIG. 13 shows the fourth example of the pattern for detection full-track profile of the present invention.

FIG. 13 shows a configuration of a pattern for detection full-track profile 54 as further another embodiment of the present invention. In order to solve the problems of the configuration shown in FIG. 12 and improve the detecting accuracy more, the pattern is multiplexed less in number and the number of servo areas is increased in the configuration shown in this FIG. 13. In FIG. 13, the vertical direction is the radial direction of the disk 12 and the horizontal direction is the circumferential direction of the disk 12. Although only the servo areas whose sector numbers are 1 to 18 are shown in the expanded view in FIG. 13, there are actually 72 servo areas 31. The track pitch is 1.78 μm and the symbol 2×Tp shown in FIG. 13 means an equivalence to 3.55 just like in the configuration shown in FIG. 1.

Three micro-servo areas 55 are provided at equal pitches between servo areas respectively. The configuration of each micro-servo area 55 is the same as that described in the related art with reference to FIG. 7 except that the gray code part 42 is removed. A micro-servo area 55 is provided only in a track width measuring zone. In a data zone where a data area 33 exists is provided only a normal servo area 31. The pattern for detection full-track profile 54 is provided in an area between a servo area 31 and a micro-servo area 55 or between micro-servo areas 55. In the sector number=1 area, four patterns for detection full-track profile can be disposed so that each pattern is deviated from another by 0.05 μm sequentially in the radial direction of the disk. The fourth pattern for detection full-track profile in the sector number=1 area is deviated by 0.05 μm from the first pattern for detection full-track profile in the sector number=2 area. In the same way, 72 patterns for detection full-track profile 54 can be written in the areas whose sector numbers are 1 to 18 sequentially. The first pattern for detection full-track profile in the sector number=1 area is deviated by 3.55 μm from the fourth pattern 54 in the sector number=18 area in the radial direction of the disk. The 3.55 μm is an equivalence to double the track pitch. In addition, the same configuration pattern as that written in the areas whose sector numbers are 1 to 18 is written in the areas whose sector numbers are 37 to 54 and 55 to 72.

The pattern 54 shown in FIG. 13 is repeated four times while the disk. 12 is rotated once. These four patterns are averaged, thereby the error caused by the mechanical vibration when in writing and reading back patterns can be reduced more than the embodiments shown in FIGS. 1 and 2 in which patterns 51 and 52 are used. In addition, because each pattern is extended and a micro-servo area 55 is provided, it is possible to solve the problems related to the pattern amplitude detecting accuracy and the clock generation accuracy of the detector circuit more than when the pattern shown in FIG. 12 is used. Although a pattern is formed by dividing a 2×Tp track width by 72 within a range of ¼ rotation of the disk in this embodiment, the track width, the disk rotation distance, and the dividing number may be decided freely.

According to the above embodiment, patterns for detection full-track profile on a disk built in the object magnetic recording disk apparatus can be detected automatically very accurately by reducing the error occurrence caused by the mechanical vibration when in writing and reading back patterns with employment of the pattern configuration, the writing process, and the detector circuit system as described in this embodiment.

EMBODIMENT 2

Figure 14:
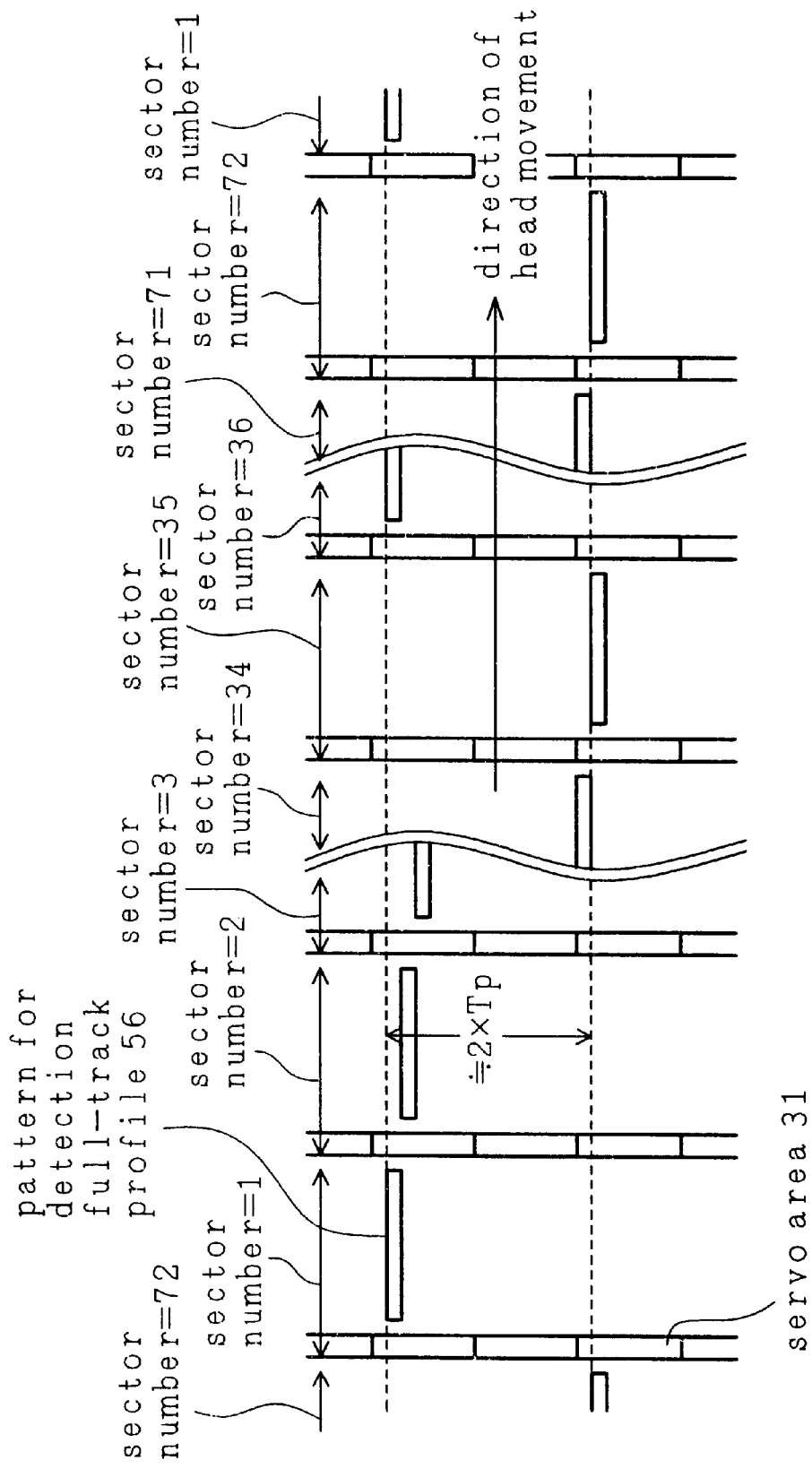
FIG. 14 shows the first example of a pattern for detection micro-track profile of the present invention.

FIG. 14 shows a configuration of a pattern for detection micro-track profile 56, which is a pattern for detecting a micro-track (having a width narrower than that of the recording track in each data area) profile as an embodiment of the present invention. This pattern configuration has many common items as the pattern for detection full-track profile 52 shown in FIG. 2. The pattern for detection micro-track profile 56 is a pattern having a width narrower than that of the recording track 331 in each data area 33. Just like the pattern configuration shown in FIG. 2, this pattern configuration includes 72 servo areas 31, the track pitch is 1.75 um, and the symbol 2×Tp means an equivalence to 3.5 um.

A pattern for detection micro-track profile 56 is written between servo areas 31 respectively. The pattern for detection micro-track profile 56 is formed with 20 MHz patterns repeated simply and having a narrow track width of not more than ¼ of the track width of the write element. Although the patterns for detection micro-track profile 56 written in the areas whose sector numbers are 1 and 2 are magnetized patterns having the same frequency, they are deviated from each other by 0.05 μm in the radial direction of the disk. In addition, the patterns for detection micro-track profile 56 written in the areas whose sector numbers are 3 to 72 are deviated by 0.05 μm from each another sequentially in the radial direction of the disk. Consequently, the patterns for detection micro-track profile 56 written in the areas whose sector numbers are 1 and 72 are deviated from each other by 3.55 μm in the radial direction of the disk. The 3.55 μm means an equivalence to double the track pitch.

To write the patterns for detection micro-track profile 56, a manufacturing apparatus referred to as a servo track writer is used in the manufacturing processes in the object factory. This is to form the pattern 56 having a track width narrower than that of the write element of the head very accurately. In order to form a pattern for detection micro-track profile 56, the disk must be rotated twice. At the first rotation, a full track is written in the sector number=1 area with 20 MHz patterns repeated simply, then the head is deviated by 0.3 μm inward in the radial direction of the disk. In this state, it is awaited until the disk is rotated up to the sector number=1 area, then a DC current is applied to the head in the sector number=2 area on the second rotation so as to erase the patterns written in the first rotation from one side and form a pattern whose track width is narrower than that of the write element of the head. The width of the pattern for detection micro-track profile 56 formed actually is narrower than 0.3 μm deviated when in erasing. This is caused by a phenomenon that the width for the head to erase old data is wider than the width for the head to write new data.

Although the pattern described in this embodiment is formed by dividing the 2×Tp track width by 36 within a range of ½ rotation of the disk, the track width, the disk rotation distance, and the dividing number may be decided freely.

It is possible to reduce the time for forming 72 patterns for micro-track profile by carrying out both write process at the first rotation and erase process at the second rotation as described above at the same head position. It does not need any time for rotating the disk by the number of times double the 72 patterns. For example, because the head position where a pattern is erased from one side in the sector number=1 area is the same as the head position where a pattern is written in the sector number=7 area, these two write and erase processes can be carried out while the disk is rotated once. The use of this method will thus be able to reduce the time for forming 72 patterns for detection micro-track profile upto a time for rotating the disk by 6+72+6=84 times.

The configuration of the decoder circuit for detecting micro-track profiles from the pattern of the present invention is almost the same as that described above in the embodiment 1 with reference to FIG. 10. However, when compared with the read-back amplitude of a full-track, the read-back amplitude of a micro-track is as small as about ⅓ to ¹⁄₁₀, so 3 to 10 times of amplifiers (AMP) are disposed serially and the switch is set to AMP. Functions of other components are the same as those in the embodiment 1.

Figure 16A:
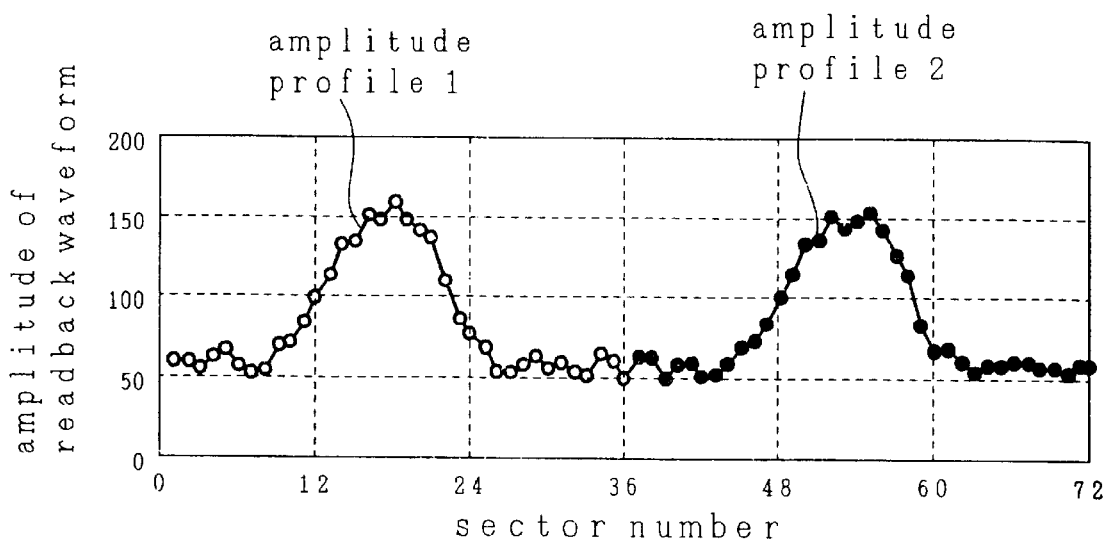
FIG. 16 shows an example of the micro-track profile detected from a pattern of the present invention.

FIG. 16(A) shows an example of detection of the read-back amplitude of a pattern for detection micro-track profile 56 shown in FIG. 14 in each sector. The pattern for detection micro-track profile is written by a head 11 on a disk 12 built in the object magnetic recording disk apparatus. The horizontal axis indicates sector numbers. Sector numbers 1 to 72 are equivalent to the number of sectors on one round of the disk. The vertical axis indicates output values from the A/D converter that detects the amplitude of each sector. The profile 1 indicated with white circles and the profile 2 indicated with black circles may not become identical sometimes due to the influence of the mechanical vibration of the servo track writer when in writing of the pattern 56 or the mechanical vibration of the spindle motor when in reading back the pattern 56.

Figure 16B:
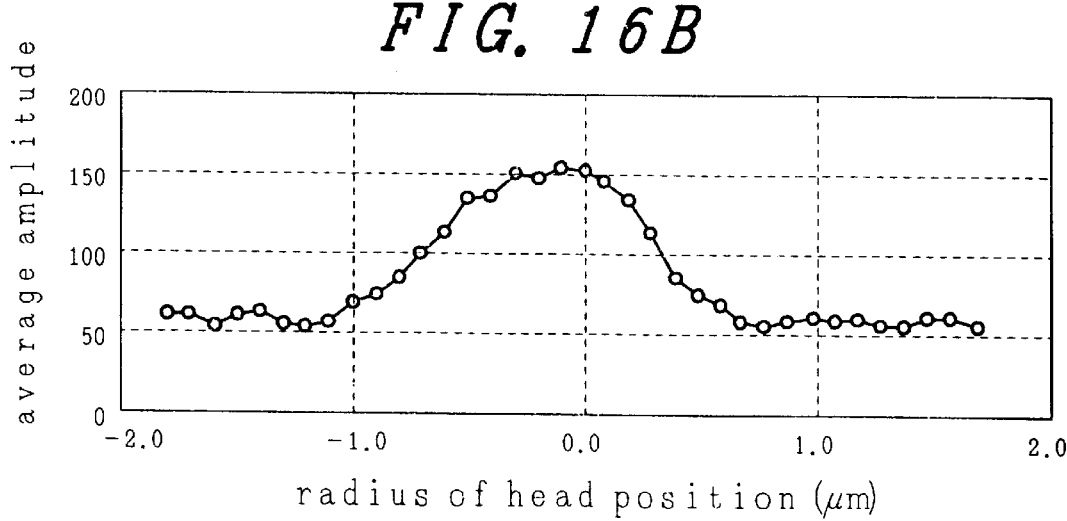

FIG. 16B shows an average of the read-back profiles 1 and 2 shown in FIG. 16 (A). The value in the horizontal axis is converted to a value in units of um. The output value, when the radial position of the head is within a range of ±1.1 um, is a value on the noise level of the detection system. This profile is a micro-track profile detected automatically on the disk built in the magnetic recording disk apparatus. The horizontal axis is calibrated with the accuracy of the laser measuring apparatus of the servo track writer.

Figure 15:
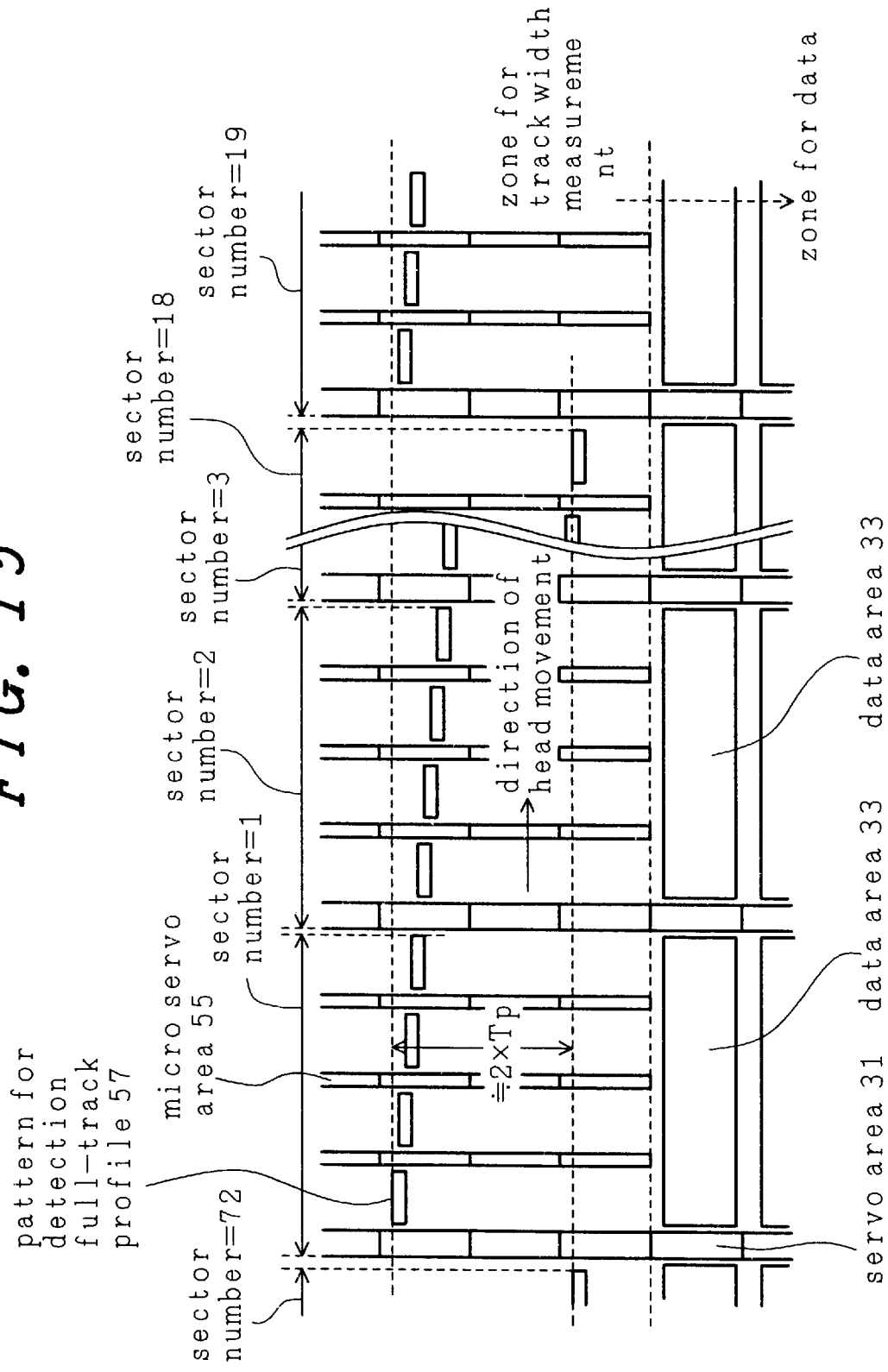
FIG. 15 shows the second example of the pattern for detection micro-track profile of the present invention.

FIG. 15 shows a configuration of a pattern for detection micro-track profile 57 as another embodiment of the present invention. In FIG. 15, the vertical direction is the radial direction of the disk 12 and the horizontal direction is the circumferential direction of the disk 12. The pattern for detection micro-track profile 57 has many common points to those of the pattern for detection micro-track profile 54 shown in FIG. 13. Just like in the configuration of the pattern 54 shown in FIG. 13, there are a total of 216 micro-servo areas 55 only in the track width measuring zone, the track pitch is 1.78 um, and the symbol 2×Tp means an equivalence to 3.55 um. In FIG. 15, of the 72 servo areas 31, only the areas whose sector numbers 1 to 18 are shown in an expanded view.

A pattern for detection micro-track profile 57 is written between a servo area 31 and a micro-servo area 55 respectively. In order to improve the detection accuracy more, the pattern 57 is multiplexed so that the number of servo areas is increased.

Four patterns for detection micro-track profile can be disposed in the sector number=1 area so that each of them is written so as to be deviated from another by 0.05 μm sequentially in the radial direction of the disk. The fourth pattern for detection micro-track profile in the sector number=1 area is also deviated by 0.05 μm from the first pattern for detection micro-track profile in the sector number=2 area. In the same way, 72 patterns for detection micro-track profile can be written sequentially in the areas whose sector numbers are 1 to 18. The first pattern in the sector number=1 area is deviated by 3.55 μm from the fourth pattern in the sector number=18 area in the radial direction of the disk. The 3.55 μm is double the track pitch. In addition, the same configuration pattern as that written in the areas whose sector numbers are 1 to 18 is written in the areas whose sector numbers are 19 to 36, 37 to 54, and 55 to 72 respectively.

The pattern 57 shown in FIG. 15 is repeated four times while the disk 12 is rotated once. Those four patterns 54 are averaged, thereby the error occurrence caused by the mechanical vibration when in writing or reading back patterns can be reduced more than when the pattern shown in FIG. 14 is used. In addition, because the pattern 57 is provided with micro-servo areas 55, the pattern amplitude detection accuracy can be improved more than when the pattern 56 shown in FIG. 14 is used. Although a pattern is formed by dividing the 2×Tp track width by 72 within a range of ¼-round of the disk in this embodiment, the track width, the disk rotation distance, and the dividing number may be decided freely.

With the employment of the pattern configuration, the writing process, and the detector circuit system described in this embodiment, the present invention has made it possible to reduce the error occurrence caused by the mechanical vibration when in writing and reading back patterns, thereby enabling micro-track profiles on a disk built in the object magnetic recording disk apparatus to be detected very accurately.

Next, a description will be made for a method for calculating an effective read-back width and an effective write width from both micro-track profile and full-track profile described above with reference to FIG. 17.

The read-back profile from a micro-track having a width narrower than that of the write element track of the head matches with the sensitivity distribution profile of the head in the leakage magnetic field of the disk in the track width direction. Consequently, the read-back profiles from the satisfactorily narrow micro-track are integrated, thereby each profile from the recording tracks in various areas can be calculated.

Figure 17A:
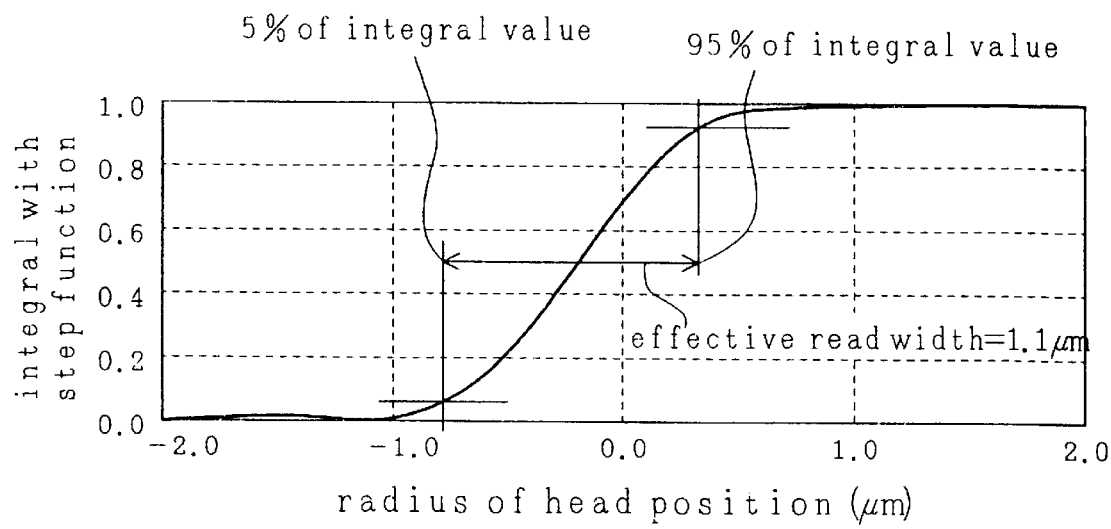
FIG. 17 shows how to calculate an effective read-back width and an effective write width of a head.

FIG. 17(A) shows a normalized result of convolution integral of the micro-track profile shown in FIG. 16B and a step function with the maximum value. Because values not within a range of ±1.1 μm of the micro-track profile is noise level ones, they are removed by a simple subtraction respectively. The horizontal axis in the graph corresponds to the radial position at the rising of the step function from 0 to 1. This profile matches with the read-back profile at one side from a vary wide recording track. If the effective read-back width of the read-back head is assumed to be a width that can output 5 to 95% of the read-back profile at one side from the very wide recording track, the effective read-back width will be found to be 1.1 μm as shown in FIG. 17(A).

Figure 17B:
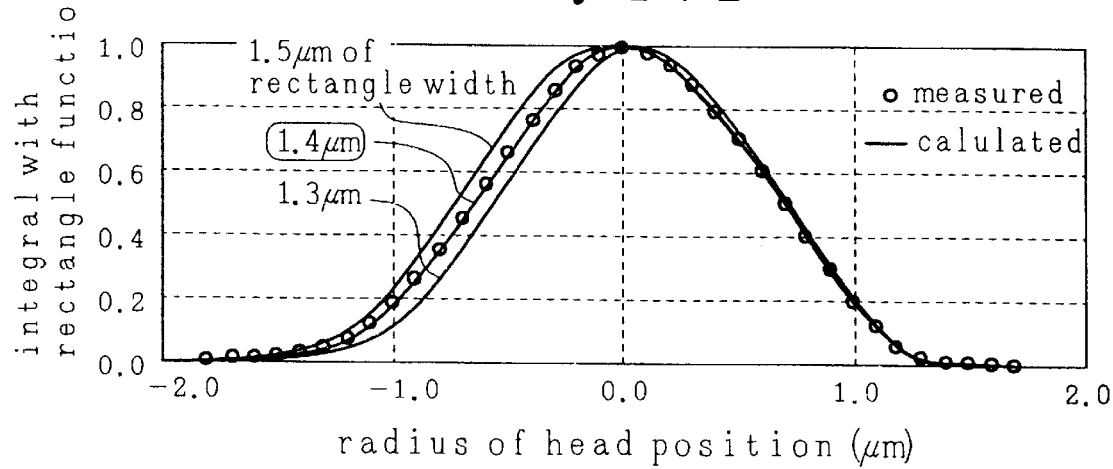

Each white circle shown in FIG. 17B is a full-track profile shown in FIG. 11B. The solid line indicates a result of normalization of the convolution integral of the micro-track profile shown in FIG. 16B and a rectangular function with the maximum value. Because values not within a range of ±1.1 μm of the micro-track profile are noise level ones, they are removed by a simple subtraction respectively. In FIG. 17B, the horizontal axis is shifted so as to match each calculation result with the right side profile each time the rectangular function width is changed to 1.3, 1.4, and 1.5 μm sequentially. Because the result of integrating by 1.4 μm matches with the measured full-track profile most satisfactorily, the effective write width will become 1.4 um. Actually, it can be judged with the value of the root sum of the difference between both values whether or not the measured value matches with the calculated value.

Next, a description will be made for a method for finding a sensitivity correction coefficient of a head position signal from a micro-track or a full-track profile with reference to FIG. 18.

Figure 18A:
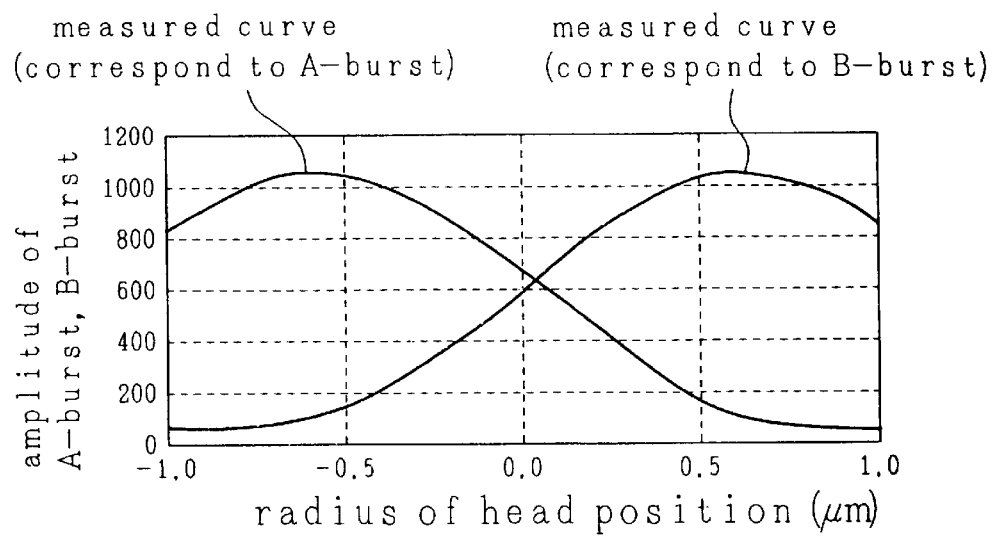
FIG. 18 shows an example of how to correct a head position signal.

FIG. 18(A) shows that a curve (measured value(=A-burst)) is for full-track profiles detected just like in the embodiment 1. This curve can also be found by convolution integral of micro-track profiles performed with use of a rectangular function, which is detected just like in the embodiment 2. The (B-burst) curve is obtained by shifting a measured value to the right (inner circumferential direction) according to a value that is the track pitch. These two curves are equivalent to the A amplitude of A-burst 43-1 and the B amplitude of B-burst 43-2 described in the related art with reference to FIGS. 7 and 8. Because the AGC is controlled so as to fix the amplitude of the ISG part 40, both A and B amplitudes are normalized with the ISG amplitude. The measured value curve shown in FIG. 18B indicates values obtained by subtracting the B amplitude from this A amplitude respectively and it is equivalent to the N position signal shown in FIG. 18B. As described in the PROBLEMS TO BE SOLVED BY THE INVENTION, this measured N position signal curve does not become a straight line in many cases.

Figure 18B:
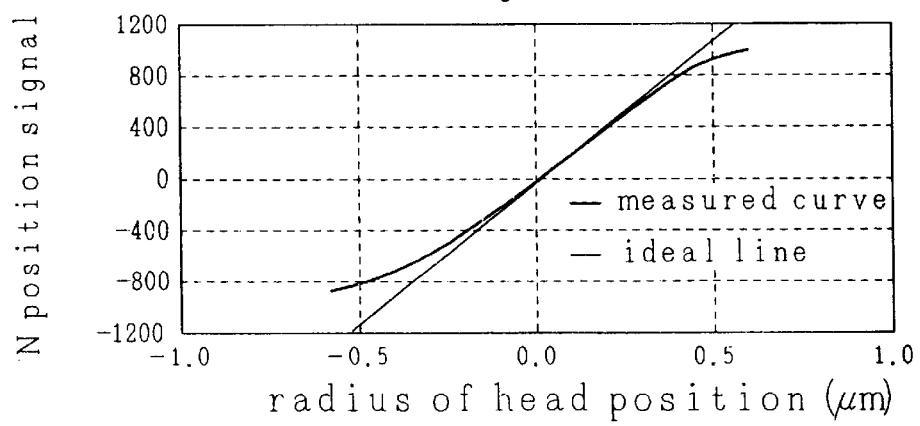

In the case of the conventional magnetic recording disk apparatus, because the apparatus is controlled on the assumption that the value shown on the vertical axis in FIG. 18B is related to a true position proportionally, an error comes to occur in a radial position of the head. This error becomes a problem especially in an operation referred to as a micro-jog that corrects an offset between the read-back element and the write element. The offset between the read-back element and the write element is changed according to the yaw angle of the slider, so the N position signal must match with an ideal straight line shown in FIG. 18B at a given radial position of the head. In addition, the change of the position signal with respect to the radial position of the head is lowered at a position near to the linkage between N and Q position signals, so the servo loop gain is further lowered as the value of ±0.6 μm comes closer in FIG. 12B. The positioning accuracy is thus degraded. These errors are referred to as non-linearity errors of position signals.

Figure 18C:
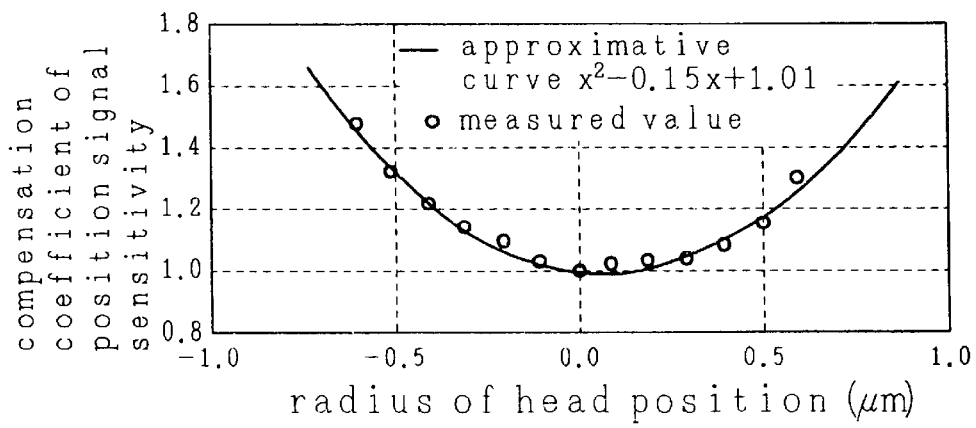

FIG. 18C shows a value obtained by dividing an ideal line by a measured line. The value can be used as a sensitivity correction coefficient of position signals. This coefficient is multiplied by a position signal detected by the servo decoder circuit, thereby enabling the non-linearity error occurrence of the above position signal to be reduced significantly. The sensitivity correction coefficient of the position signal found here is written beforehand in the memory of the package board 17 or in part of the management area of the disk 12 for each head.

The burst part 43 of the servo area 31 is usually formed with a plurality of write operations in the width direction of the track, so the width is often different from the width of the normal data track. Consequently, when finding a sensitivity correction coefficient of the position signal of the head, the width of the pattern for detection full-track profile must be adjusted to the width of the track in the burst part 43. In addition, when finding a sensitivity correction coefficient of the position signal of the head through convolution integral of a micro-track read-back profile and a rectangular function, the width of the rectangular function must be adjusted to the track width of the actual burst part 43. To find a sensitivity correction coefficient of the position signal of the head more accurately, a plurality of patterns for detection full-track profile must be prepared at different radial positions of the head and a sensitivity correction coefficient of the position signal in each of those radial positions can be calculated.

According to this embodiment, because a correction table is created for each of the heads mounted in the object magnetic recording disk apparatus, it is possible to improve the positioning accuracy of the head, thereby enabling the track density of the apparatus to be improved more. The creation process of the correction tables can be automated for the apparatus independently, so that the process can be included in the production processes easily. In addition, those correction tables are created with use of the servo decoder circuit provided in each apparatus, so the property variation of the servo decoder circuit can also be corrected at the same time.

Next, a description will be made for a method for detecting a variation of the head position signal with use of a pattern for detection full-track profile with reference to FIG. 19.

Figure 19A:
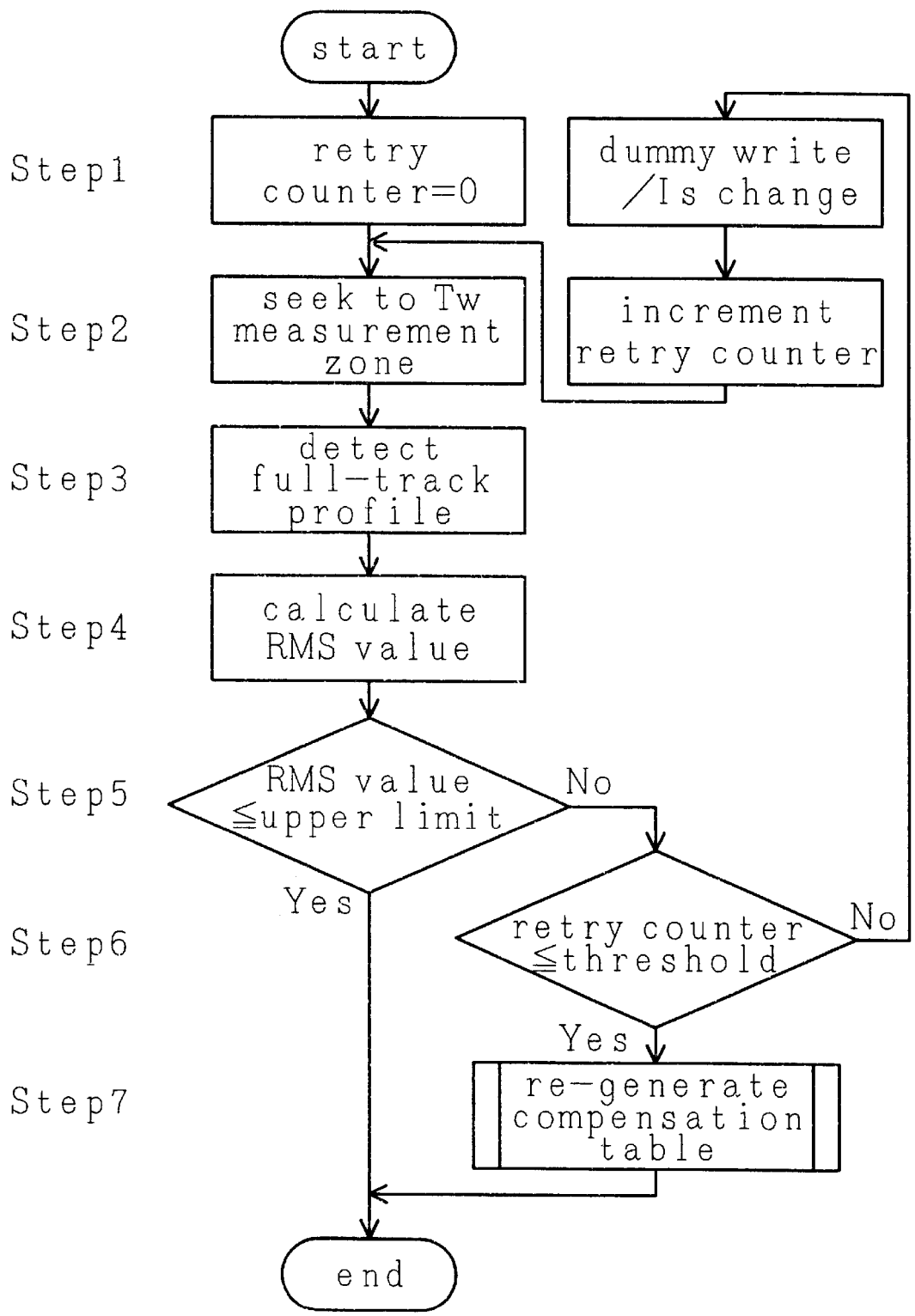
FIG. 19 shows an example of how to detect and correct a variation of the head position signal from a full-track profile.

In steps 1 to 3 shown in FIG. 19(A), the head is instructed to seek a track width measuring zone so as to follow the track, thereby detecting a full-track profile from a pattern for detection micro-track profile. Those processes are the same as those described in the embodiment 1. In step 4, a root sum (RMS value) is calculated from the difference between the detected full-track profile and the reference profile. This reference profile is a measured value obtained from each head and written in the memory of the package board 17 or in part of the management area of the disk 12 beforehand. In step 5, the RMS value is compared with the upper limit value. If the RMS value is less than the upper limit value, the state is judged to be normal, thus the processing is finished.

Figure 19B:
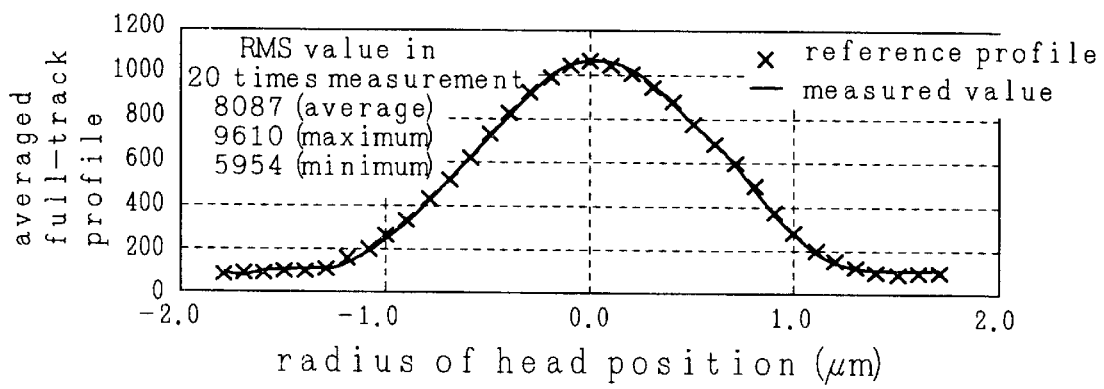
Figure 19C:
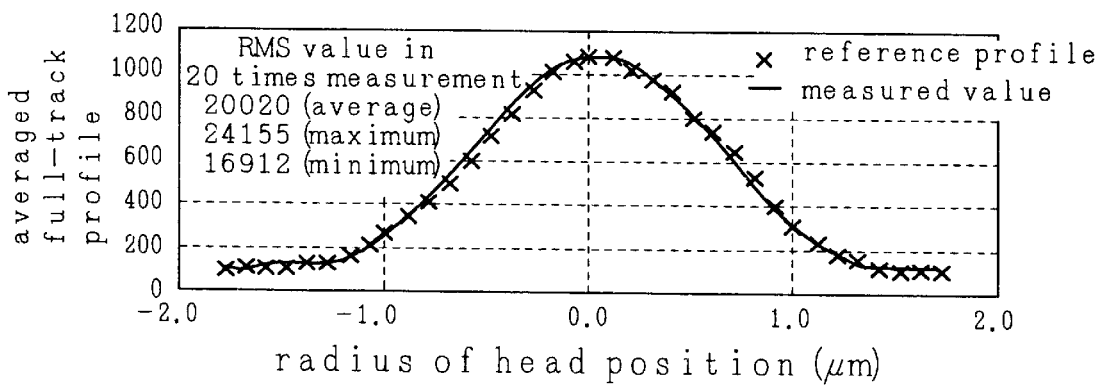

FIG. 19B shows a full-track profile measured at a normal time and a reference profile. After 20 times of measurement, the average of the RMS values was 8087 and the maximum and minimum values were 9610 and 5954. Next, FIG. 19( ) shows a full-track profile measured when a head position signal is varied and a reference profile. After 20 times of measurement, the average of the RMS values was 20020 and the maximum and minimum values were 24155 and 16912. If the upper limit of the RMS value is set to about 12000, it would be possible to detect a variation of the head position signal surely. The RMS value described here is a unit used inside computers and real values are not discussed.

Furthermore, a description will be made for a processing carried out if the magnetized state of the read-back element is disturbed, thereby the output of the position signal is judged to be varied. If the retry count exceeds a predetermined value in step 6, it is judged that the head position signal is stabilized enough. Thus, a routine for regenerating the correction table of the position signal is called in step 7. The process for creating the correction table of the position signal is the same as that described in the embodiment 3.

If the retry count is judged to be within the predetermined value in step 6, control goes to the retry processing. In this retry processing, the head is instructed to seek a zone where no user data exists and a write operation (dummy write operation) is carried out so as to apply an external magnetic field to the read-back element intentionally. After the dummy write operation, the same processes in step 2 and after are repeated. If the normal state is not restored after the dummy write operation, the sense current (Is) applied to the read-back element is increased or decreased, thereby improving the effect of the dummy write operation. In stead of the dummy write operation employed for restoring the read-back element to the normal state here, a more complicated process may be employed so as to improve the effect of the retry.

Next, a description will be made for a method for detecting a property variation of the read-back element of the head with use of a pattern for detection micro-track profile with reference to FIG. 20.

Figure 20A:
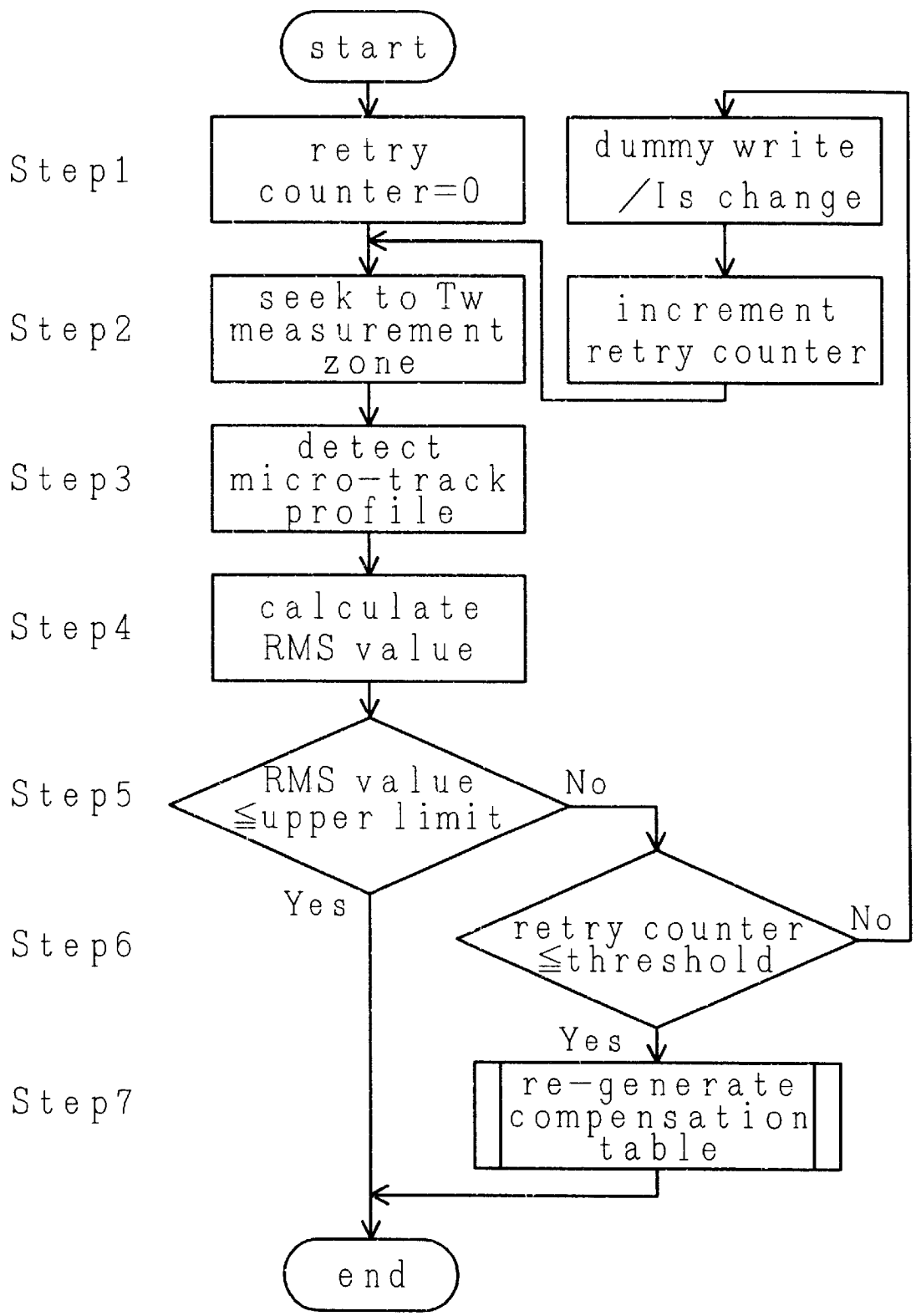
FIG. 20 shows an example of how to detect and correct a property variation of a read-back element from a profile of a micro-track.

In steps 1 to 3 shown in FIG. 20(A), the head is instructed to seek a track width measuring zone and follow up the track, thereby a micro-track profile is detected from the pattern for detection micro-track profile. The processes are the same as those described in the embodiment 2. In step 4, the RMS value is calculated from between the detected micro-track profile and the reference profile. The reference profile is a value measured for each head beforehand and written in the memory of the package board 17 or in part of the management area of the disk 12. In step 5, the RMS value is compared with the upper limit value. If the RMS value is within the upper limit value, the state is judged to be normal and the processing is finished.

Figure 20B:
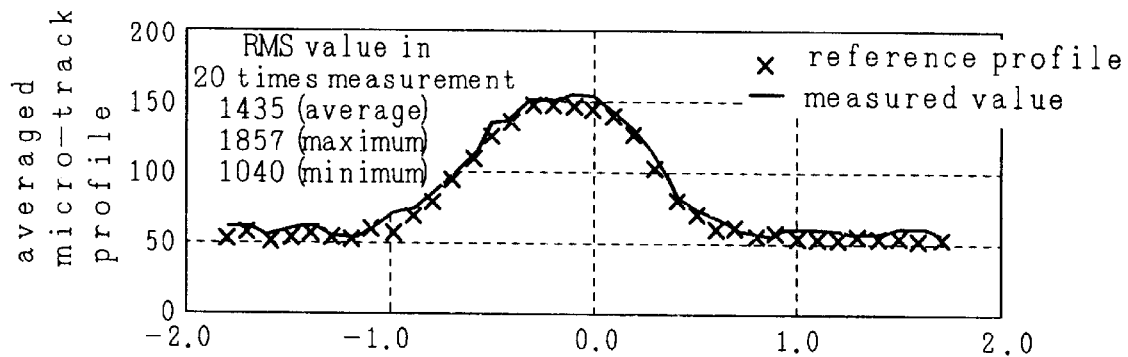
Figure 20C:
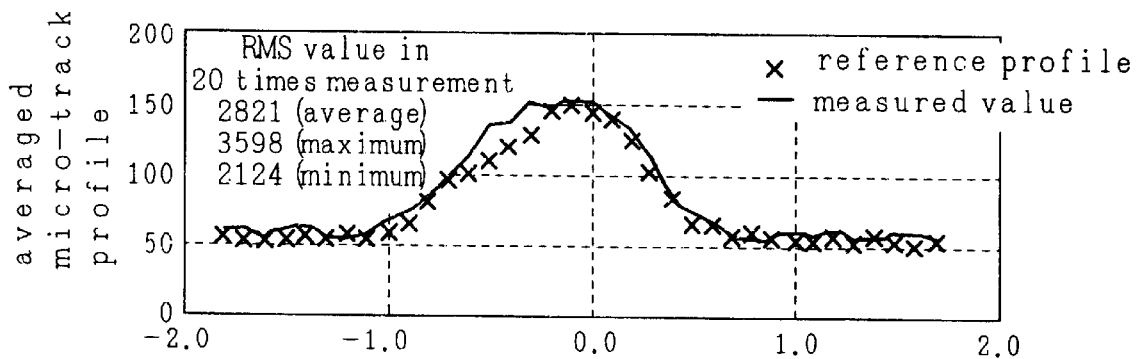

FIG. 20B shows a micro-track profile measured at a normal time and the reference profile. After 20 times of measurement, the average of the RMS values was 1435. The maximum and minimum values were 1857 and 1040. Next, FIG. 20C shows a micro-track profile measured when a property variation occurs in the read-back element and the reference profile. After 20 times of measurement, the average of the RMS values was 2821. The maximum and minimum values were 3598 and 2124. If the upper limit of the RMS value is set to about 2000, it would be possible to detect a property variation of the read-back element surely. The RMS value described here is a unit used inside computers and real values are not discussed.

Furthermore, a description will be made for a processing to be executed if the RMS value exceeds the upper limit value and the magnetized state of the read-back element is disturbed, thereby a variation is detected in the property. If the retry count exceeds a preset value in step 6, the read-back element head position signal is possibly stabilized enough, so that a routine for learning the initial values of various parameters for the signal processing is called in step 7.

If the retry count is still within the preset value in step 6, control goes to the retry processing. The retry processing is executed with use of a method that lets the head seek a zone where no user data exists, then execute a write operation (dummy write), thereby applying an external magnetic field to the read-back element intentionally. After that dummy write operation, the processings in step 2 and after are repeated. If the normal state is not restored with a dummy write operation, the sense current (Is) applied to the read-back element is increased/decreased, thereby improving the effect of the dummy write operation. In stead of the dummy write operation process employed to normalize the read-back element in this embodiment, a more complicated process may also be employed to improve the effect of the retry more.

According to this embodiment, therefore, because it is possible to detect a phenomenon that the magnetized state of the read-back element is disturbed, thereby the position signal output is varied, it is possible to avoid such a fatal error as overwriting an adjacent data track as a result of write operation offset from the target data track. Thus, the reliability of the magnetic recording disk apparatus has come to be improved significantly. In addition, even when the position signal output is varied, the position signal correction table is recreated, thereby the same head positioning accuracy as that before the variation occurs can be kept as is. Consequently, the track density of the magnetic recording disk apparatus has been improved successfully. In addition, because a property variation of the read-back element can be detected only by reading back a detection pattern, it is possible to reduce such a recovery processing time as dummy write operation, etc., thereby enabling the access performance of the magnetic recording disk apparatus to be improved more.

Furthermore, because it is possible to reduce error occurrence by correcting the non-linearity of the head position signal caused by the degradation of the sensitivity at the end part and disturbance of the magnetizing direction of the head read-back element, the head positioning accuracy can be improved more. In addition, because it is possible to detect a property variation of the read-back element related to a variation of the head position signal surely and correct the variation level, the reliability of the head positioning can be improved significantly.

The present invention, therefore, can provide a magnetic recording disk apparatus that has increased the data track density in the radial direction, thereby having improved both of the storage capacity and the reliability successfully.

What is claimed is:

1. A magnetic recording disk apparatus, comprising:

a magnetic recording disk medium having a plurality of tracks formed thereon in a concentric circle pattern; a plurality of servo areas, in each of which a servo pattern is recorded, formed in said tracks; a data area formed between the servo areas; a plurality of micro-servo areas disposed in said data area, each of which divides said data area into several different areas; and a plurality of patterns disposed between each of said micro-servo areas;

a magnetic head including a read element and a write element;

a servo decoder for generating a head position signal from said servo pattern; and means for correcting a deviation of the head position by detecting a signal from said plurality of patterns; wherein a length of each of said plurality of patterns in the track length direction is less than a length between said micro-servo areas, a width of said plurality of patterns in the track width direction is less than a track width of said data area, and an area of each said micro-servo area is smaller than that of each said servo area.

2. A magnetic recording disk apparatus according to claim 1; wherein a plurality of said patterns are disposed on two or more tracks.

3. A magnetic recording disk apparatus, comprising:

a magnetic recording disk medium having a plurality of tracks formed thereon in a concentric circle pattern; a plurality of servo areas, in each of which a servo pattern is recorded, formed in said tracks; a data area formed between the servo areas; a plurality of micro-servo areas disposed in said data area, each of which divides said data area into several different areas; and a plurality of patterns disposed between each of said micro-servo areas;

a magnetic head including a read element and a write element;

a servo decoder for generating a head position signal from said servo pattern; and means for correcting a deviation of the head position by detecting a signal from said plurality of patterns; wherein a length of each of said plurality of patterns in the track length direction is less than a length between said micro-servo areas, a width of said plurality of patterns in the track width direction is equal to a track width of said data area, and an area of each said micro-servo area is smaller than that of each said servo area.

4. A magnetic recording disk apparatus according to claim 3; wherein a plurality of said patterns are disposed on two or more tracks.

* * * * *